United States Patent
Aida

(10) Patent No.: US 11,082,145 B2
(45) Date of Patent: *Aug. 3, 2021

(54) OPTICAL BRANCHING/COUPLING DEVICE AND OPTICAL BRANCHING/COUPLING METHOD

(71) Applicant: NEC Corporation, Tokyo (JP)

(72) Inventor: Ryuji Aida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,654

(22) Filed: Jun. 16, 2020

(65) Prior Publication Data
US 2020/0313789 A1 Oct. 1, 2020

Related U.S. Application Data

(63) Continuation of application No. 16/341,479, filed as application No. PCT/JP2017/038046 on Oct. 20, 2017, now Pat. No. 10,715,270.

(30) Foreign Application Priority Data

Oct. 25, 2016 (JP) .................................. 2016-208265

(51) Int. Cl.
*H04J 14/02* (2006.01)
*H04B 10/03* (2013.01)
*H04B 10/032* (2013.01)

(52) U.S. Cl.
CPC .......... *H04J 14/0212* (2013.01); *H04B 10/03* (2013.01); *H04B 10/032* (2013.01);
(Continued)

(58) Field of Classification Search
None
See application file for complete search history.

(56) References Cited

U.S. PATENT DOCUMENTS 7,254,293 B1 8/2007 Helkey et al.
9,048,974 B2 6/2015 Wisseman
(Continued)

FOREIGN PATENT DOCUMENTS

CN 1728608 A 2/2006
CN 101136717 A 3/2008
(Continued)

OTHER PUBLICATIONS

International Search Report for PCT Application No. PCT/JP2017/038046, dated Nov. 28, 2017.
(Continued)

*Primary Examiner* — Li Liu
(74) *Attorney, Agent, or Firm* — Sughrue Mion, PLLC

(57) ABSTRACT

An optical branching/coupling device includes: a first optical branching unit that splits first light with a first and a second wavelength, and outputs second light and third light; a wavelength selector that receives the second light, receives fourth light with a third wavelength, output fifth and sixth light, one of the fifth light and the sixth light including an optical signal of the first wavelength of the second light and including the fourth light, and the other including an optical signal of the second wavelength; a first light switch that receives the fifth light and the sixth light, output one of the fifth light and the sixth light as seventh light, and output the other as eighth light; and a second light switch that receives the third light, receives the eighth light, and outputs the third or the eighth light that have been input as ninth light.

10 Claims, 20 Drawing Sheets

(52) U.S. Cl.
CPC ...... *H04J 14/0204* (2013.01); *H04J 14/0205* (2013.01); *H04J 14/0287* (2013.01)

(56) References Cited

U.S. PATENT DOCUMENTS

| | | | |
|---|---|---|---|
| 9,106,983 B2 | 8/2015 | Ji et al. | |
| 10,715,270 B2* | 7/2020 | Aida | H04J 14/0204 |
| 2004/0197041 A1* | 10/2004 | Lu | G02B 6/2935 |
| | | | 385/3 |
| 2006/0045532 A1 | 3/2006 | Yano | |
| 2008/0056715 A1 | 3/2008 | Akiyama et al. | |
| 2009/0041457 A1* | 2/2009 | Maki | H04J 14/0217 |
| | | | 398/45 |
| 2011/0200322 A1* | 8/2011 | Kovsh | H04J 14/0209 |
| | | | 398/2 |
| 2011/0280263 A1* | 11/2011 | Kieu | H01S 3/06791 |
| | | | 372/6 |
| 2013/0188957 A1 | 7/2013 | Deng | |
| 2013/0259475 A1* | 10/2013 | Ji | H04Q 11/00 |
| | | | 398/48 |
| 2015/0043920 A1* | 2/2015 | Ji | H04J 14/021 |
| | | | 398/83 |
| 2015/0093111 A1* | 4/2015 | Wang | H04J 14/0205 |
| | | | 398/48 |
| 2016/0149663 A1* | 5/2016 | Ji | H04J 14/0204 |
| | | | 398/48 |
| 2016/0301467 A1* | 10/2016 | Ji | H04J 14/0297 |
| 2017/0117982 A1* | 4/2017 | Ji | H04J 14/0212 |
| 2017/0230109 A1 | 8/2017 | Kawai | |
| 2018/0054271 A1 | 2/2018 | Abe | |
| 2018/0070156 A1 | 3/2018 | Kawai | |
| 2018/0219619 A1* | 8/2018 | Takigawa | H04Q 11/0005 |

FOREIGN PATENT DOCUMENTS

| | | |
|---|---|---|
| CN | 101141221 A | 3/2008 |
| JP | 2005-128442 A | 5/2005 |
| JP | 2011-239275 A | 11/2011 |
| JP | 2013-520139 A | 5/2013 |
| WO | 2016/017181 A1 | 2/2016 |
| WO | 2016/147610 A1 | 9/2016 |
| WO | 2016/152115 A1 | 9/2016 |

OTHER PUBLICATIONS

English translation of Written opinion for PCT Application No. PCT/JP2017/038046, dated Nov. 28, 2017.
Extended European Search Report for EP Application No. 17865743.3 dated Sep. 27, 2019.
Chinese Office Action for CN Application No. 201780065220.4 dated Apr. 24, 2020 with English Translation.
Extended European Search Report for EP Application No. EP20202051.7 dated Feb. 8, 2021.

* cited by examiner

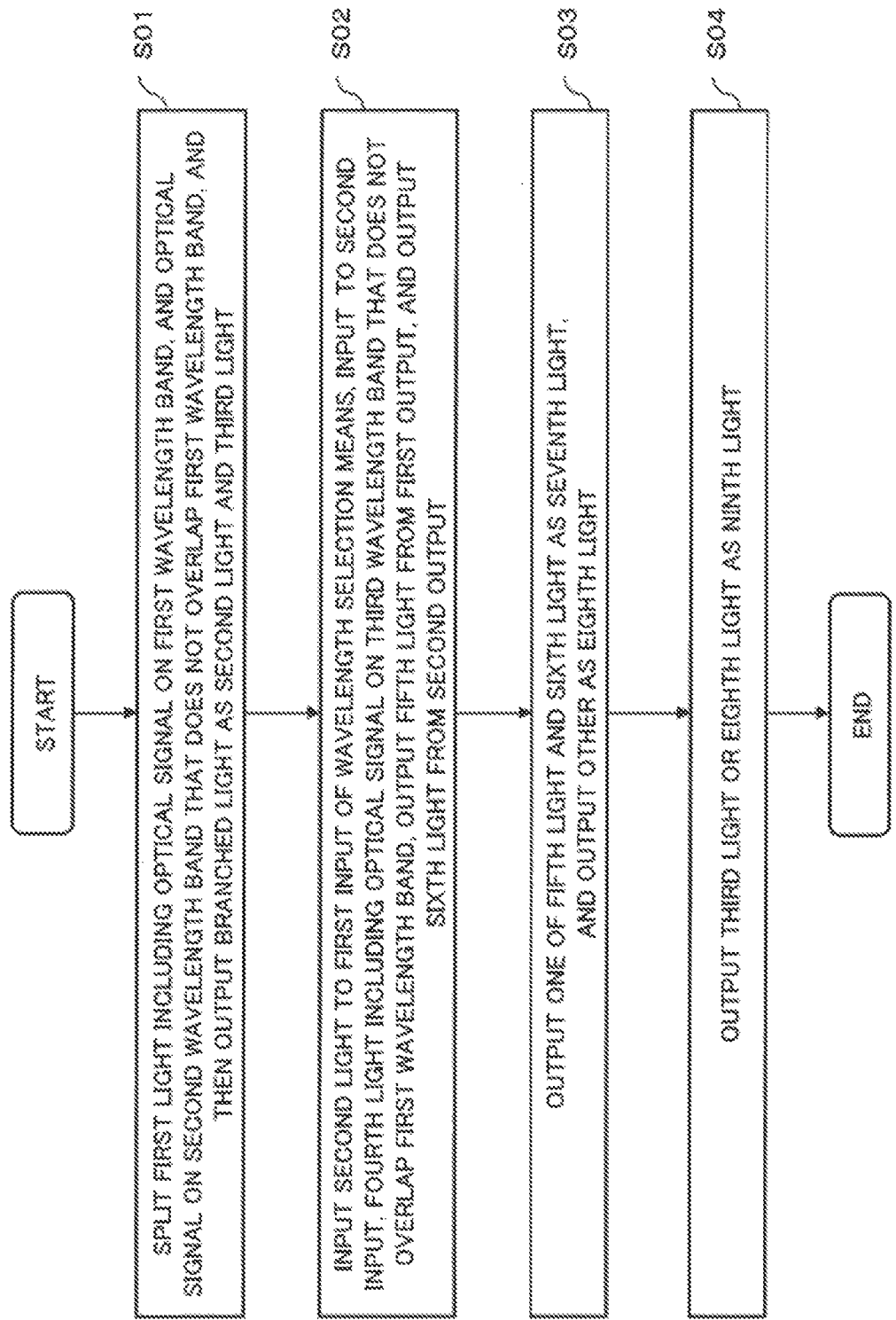

OPTICAL BRANCHING/COUPLING DEVICE AND OPTICAL BRANCHING/COUPLING METHOD

REFERENCE TO RELATED APPLICATION

The present application is a Continuation application of Ser. No. 16/341,479 filed on Apr. 12, 2019, which is a National Stage Entry of PCT/JP2017/038046 filed on Oct. 20, 2017, which claims priority from Japanese Patent Application 2016-208265 filed on Oct. 25, 2016, the contents of all of which are incorporated herein by reference, in their entirety.

TECHNICAL FIELD

The present invention relates to an optical branching/coupling device and an optical branching/coupling method, and particularly relates to an optical branching/coupling device including a function of splitting and coupling a wavelength-multiplexed optical signal, and an optical branching/coupling method used for the optical branching/coupling device.

BACKGROUND ART

In a way similar to an optical communication system on land, a submarine cable system is also required to be capable of flexibly changing a configuration of a network, and to be robust against disaster. Thus, a submarine cable system is also requested to achieve an optical branching/coupling device including a wavelength switching function (ROADM function) being capable of remotely controlling, by use of a wavelength selective switch (WSS) used in a land system, setting of a communication system after start of operation. WSS is an abbreviation of wavelength selective switch, and ROADM is an abbreviation of reconfigurable optical add/drop multiplexing (a resettable optical branching/coupling function).

In relation to the present invention, PTL 1 describes a technique for achieving a network system by disposing a wavelength cross-connect (WXC) device in a node.

CITATION LIST

Patent Literature

[PTL 1] Japanese Unexamined Patent Application Publication No. 2011-239275

SUMMARY OF INVENTION

Technical Problem

A WSS is a precision device, and in order to apply a WSS to an optical branching/coupling device of a submarine cable system for which a long-period (e.g. 25-years) performance guarantee is required, it is necessary to achieve enhanced reliability of an optical branching/coupling device by elaborating a configuration of the optical branching/coupling device. Thus, when a WSS is applied to an optical branching/coupling device, such problems as an increase in development cost and prolongation of a development period arise. Moreover, PTL 1 does not mention an enhanced reliability technique of an optical branching/coupling device using a WSS.

OBJECT OF INVENTION

An object of the present invention is to provide an optical branching/coupling device having high reliability.

Solution to Problem

An optical branching/coupling device of the present invention includes:

a first optical branching means configured in such a way as to be able to split first light including an optical signal on a first wavelength band and an optical signal on a second wavelength band that does not overlap the first wavelength band, and then output branched light as second light and third light;

a wavelength selection means configured in such a way that the second light can be input to a first input, fourth light including an optical signal on a third wavelength band that does not overlap the first wavelength band can be input to a second input, fifth light can be output from a first output, sixth light can be output from a second output, either one of the fifth light or the sixth light can include an optical signal on the first wavelength band of the second light and also include the fourth light, and another can include an optical signal on the second wavelength band;

a first optical switching means configured in such a way that the fifth light can be input to one of two inputs, the sixth light can be input to another, either one of the fifth light or the sixth light can be output as seventh light, and another can be output as eighth light; and a second optical switching means configured in such a way that the third light can be input to one of two inputs, the eighth light can be input to another, and either one of the input third light or eighth light can be output as ninth light.

An optical branching/coupling method of the present invention includes:

splitting input first light having a first wavelength band and a second wavelength band that does not overlap the first wavelength band, and then outputting branched light as second light and third light;

generating, based on the second light, and fourth light having a third wavelength band that does not overlap the first wavelength band, fifth light including at least one of a signal on the first wavelength band of the second light, and the fourth light, and sixth light including at least one of a signal on the first or second wavelength band of the second light, and the fourth light;

outputting either one of the fifth light or the sixth light as seventh light, and outputting another as eighth light; and outputting the third light or the eighth light as ninth light.

Advantageous Effects of Invention

The present invention has an advantageous effect of being able to provide an optical branching/coupling device having high reliability.

BRIEF DESCRIPTION OF DRAWINGS

FIG. 20 A flowchart illustrating an example of an operation procedure of the optical branching/coupling device 300

EXAMPLE EMBODIMENT

Figure 1:
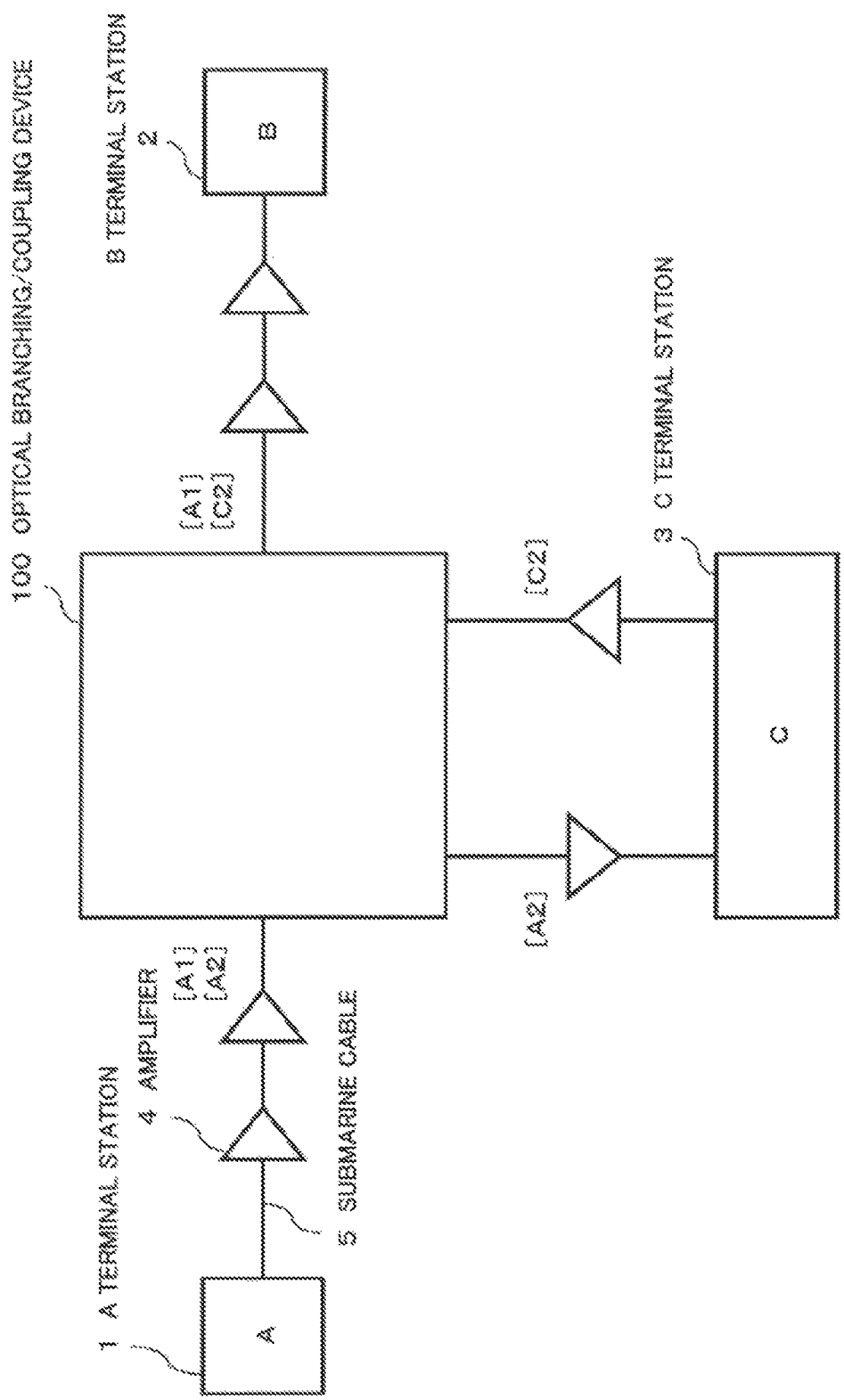
FIG. 1 A block diagram illustrating a configuration example of a submarine cable system 10 according to a first example embodiment FIG. 2 A block diagram illustrating a configuration example of an optical branching/coupling device 100 according to the first example embodiment FIG. 3 A block diagram illustrating an operation example of the optical branching/coupling device 100 when a WSS 131 is broken, and a WSS 132 is normally operating FIG. 4 A block diagram illustrating an operation example of the optical branching/coupling device 100 when the WSS 132 is broken, and the WSS 131 is normally operating FIG. 5 A block diagram illustrating an operation example of the optical branching/coupling device 100 when the WSS 131 and the WSS 132 are both broken FIG. 6 A block diagram illustrating a modification example of the optical branching/coupling device 100 according to the first example embodiment FIG. 7 A block diagram illustrating a configuration example of an optical branching/coupling device 200 according to a second example embodiment FIG. 8 A block diagram illustrating an operation example of the optical branching/coupling device 200 when a WSS 131 is broken, and a WSS 132 is normally operating FIG. 9 A block diagram illustrating an operation example of the optical branching/coupling device 200 when the WSS 132 is broken, and the WSS 131 is normally operating FIG. 10 A block diagram illustrating a first operation example of the optical branching/coupling device 200 when the WSS 131 and the WSS 132 are both broken FIG. 11 A block diagram illustrating a second operation example of the optical branching/coupling device 200 when the WSS 131 and the WSS 132 are both broken FIG. 12 A block diagram illustrating a third operation example of the optical branching/coupling device 200 when the WSS 131 and the WSS 132 are both broken FIG. 13 A block diagram illustrating a configuration example of a wavelength selection unit 120 when the WSSs 131 and 132 include input ports Q1 to Qn FIG. 14 A diagram illustrating an example of a connection state of an input/output of a switch 111

Example embodiments of the present invention are described below. An arrow in the drawings is given as an example in order to describe a direction of a signal in the example embodiments, and does not mean limitation of a direction of a signal. Moreover, an intersection point of straight lines each indicating a path of a signal in each block diagram does not mean coupling of intersecting signals unless otherwise specially described. Note that a same reference sign is given to an already-illustrated element in each drawing, and a repeated description is omitted.

First Example Embodiment

FIG. 1 is a block diagram illustrating a configuration example of a submarine cable system 10 according to a first example embodiment of the present invention. The submarine cable system 10 includes an A terminal station 1, a B terminal station 2, a C terminal station 3, and an optical branching/coupling device 100. The A terminal station 1, the B terminal station 2, and the C terminal station 3 are described as terminal stations 1 to 3 when generically called.

Each of the terminal stations 1 to 3 is a terminal station placed on land, and is an interface between a signal transmitted through a submarine cable 5, and a network on land. The terminal stations 1 to 3 are connected to the optical branching/coupling device 100 via the submarine cable 5. The submarine cable 5 includes an optical fiber serving to transmit an optical signal, and may be provided with one or more amplifiers 4 midway. The amplifier 4 is, for example, an optical fiber amplifier using an amplification medium doped with erbium. The optical branching/coupling device 100 is a node including a reconfigurable optical add/drop multiplexing (ROADM) function, and is also called a ROADM branching/coupling device or a ROADM node. The optical branching/coupling device 100 is placed undersea, splits and couples an input optical signal by a wavelength unit, and thereby switches an output destination of the optical signal by a wavelength unit.

In the present example embodiment, the A terminal station 1 transmits wavelength division multiplexing (WDM) optical signals including optical signals on wavelength bands A1 and A2 to the optical branching/coupling device 100. The optical signal on the wavelength band A1 is an optical signal a destination of which is the B terminal station 2, and the optical signal on the wavelength band A2 is an optical signal a destination of which is the C terminal station 3. The C terminal station 3 receives, from the optical branching/coupling device 100, the optical signal on the wavelength band A2 transmitted by the A terminal station 1. The C terminal station 3 transmits, to the optical branching/coupling device 100, an optical signal on a wavelength band C2 a destination of which is the B terminal station 2. The B terminal station 2 receives, from the optical branching/coupling device 100, a WDM optical signal in which the optical signal on the wavelength band A1 transmitted by the A terminal station 1 and the optical signal on the wavelength band C2 transmitted by the C terminal station 3 are multiplexed.

To the optical branching/coupling device 100, WDM optical signals on the wavelength bands A1 and A2 are input from the A terminal station 1, and an optical signal on the wavelength band C2 is input from the C terminal station 3. The optical branching/coupling device 100 generates, from these optical signals, a WDM optical signal including the optical signals on the wavelength bands A1 and C2, then transmits the WDM optical signal to the B terminal station 2, and transmits, to the C terminal station 3, the optical signal on the wavelength band A2 split from the WDM optical signal received from the A terminal station 1.

Herein, the wavelength band A1 and the wavelength band A2 do not overlap each other. Moreover, the wavelength band A1 and the wavelength band C2 do not overlap each other either. In the following text, a WDM optical signal including optical signals on the wavelength bands A1 and A2 transmitted by the A terminal station 1 is described as a "WDM optical signal ([A1][A2])".

A WDM optical signal including an optical signal on the wavelength band A1 transmitted by the A terminal station 1 and an optical signal on the wavelength band C2 transmitted by the C terminal station 3 is described as a "WDM optical signal ([A1][C2])". Moreover, an optical signal on the wavelength band A2 being split from the WDM optical signal ([A1][A2]) and transmitted by the A terminal station 1 is described as an "optical signal ([A2])". Similarly, an optical signal on the wavelength band C2 being transmitted by the C terminal station 3 is described as an "optical signal ([C2])". Moreover, an optical signal is simply described as [A1], [A2], or [C2] in each block diagram.

Figure 2:
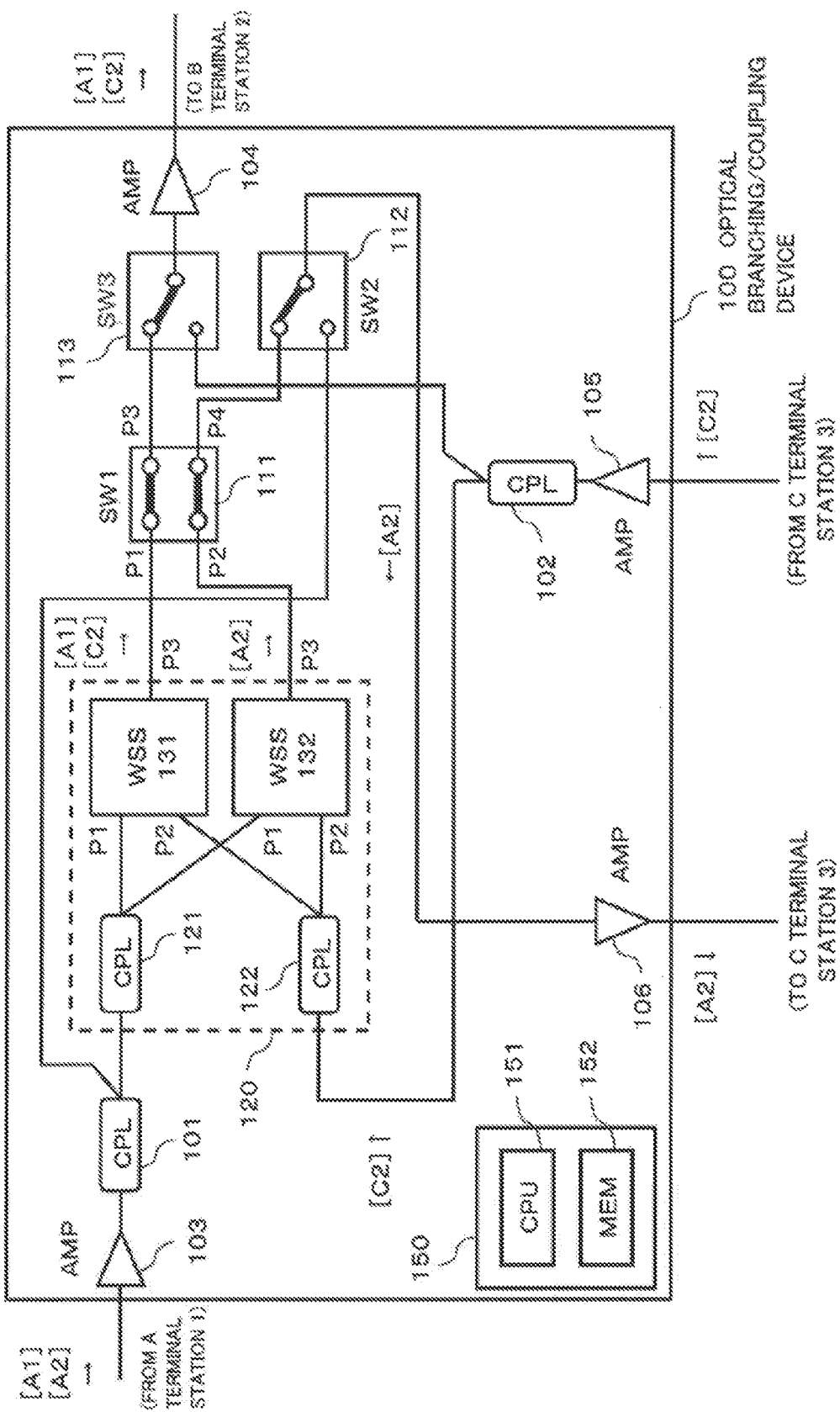

Then, details of a configuration and an operation of the optical branching/coupling device 100 are described. FIG. 2 is a block diagram illustrating a configuration example of the optical branching/coupling device 100. The optical branching/coupling device 100 includes couplers (CPL) 101 to 102 and 121 to 122, amplifiers (AMP) 103 to 106, switches (SW1 to SW3) 111 to 113, and wavelength selective switches (WSS) 131 to 132. The optical branching/coupling device 100 may further include a control circuit 150, a central processing unit (CPU) 151, and a memory device (MEM) 152. Optical components included in the optical branching/coupling device 100 are connected by an optical circuit using an optical fiber, an optical waveguide, optical spatial propagation, or the like.

The couplers 101 to 102 and 121 to 122 are 1×2 optical couplers, and each branch, into two ways, and output an input optical signal. A branching ratio of each coupler is, but not limited to, for example, 1:1. Fused fiber couplers or optical waveguide couplers can be used as the couplers 101 to 102 and 121 to 122.

The amplifiers 103 to 106 are optical amplifiers provided inside of the optical branching/coupling device 100 as needed. Optical fiber amplifiers or semiconductor optical amplifier can be used as the amplifiers 103 to 106. The amplifiers 103 to 106 compensate an optical level inside of the optical branching/coupling device 100. Moreover, when the amplifiers 103 to 106 are optical fiber amplifiers, the amplifiers 103 to 106 may generate a response signal serving to inform one of the terminal stations 1 to 3 of a state of the optical branching/coupling device 100, by applying modulation to driving current of a pump laser diode (LD).

The switch 111 is a 2×2 optical switch including input ports P1 and P2, and output ports P3 and P4, and the switches 112 and 113 are 1×2 optical switches. Optical waveguide switches, mechanical switches, or micro electro mechanical systems (MEMS) switches can be used as the switches 111 to 113.

The WSSs 131 to 132 are wavelength selection switches each including input ports P1 and P2, and an output port P3. The WSSs 131 to 132 split and couple optical signals input from the respective input ports P1 and P2 by a wavelength unit, and then output the optical signals from the respective output port P3. Connection between the input and output ports inside the WSSs 131 and 132, and wavelength bands of optical signals output from the WSSs 131 to 132 may be controlled from outside (e.g., one of the terminal stations 1 to 3) of the WSSs 131 to 132, or may be controlled by the control circuit 150. Moreover, the control circuit 150 may control connection of the inputs and outputs of the switches 111 to 113. The control circuit 150 may include a function of monitoring operation states of the WSSs 131 and 132, and control the switches 111 to 113, based on the operation states of the WSSs 131 to 132.

Note that a block combining the couplers 121 and 122, and the WSSs 131 and 132 has a function of outputting an optical signal selected based on a wavelength of an input optical signal. Therefore, this block can be called a wavelength selection unit 120.

1-1. A Case where the WSS 131 and the WSS 132 are Normally Operating

Referring to FIG. 2, when the WSS 131 and the WSS 132 are both normally operating, the WDM optical signal ([A1][A2]) transmitted from the A terminal station 1 is input to the optical branching/coupling device 100. The WDM optical signal ([A1][A2]) input to the optical branching/coupling device 100 is input to the P1 of each of the WSSs 131 and 132 through the amplifier 103, and the couplers 101 and 121. The optical signal ([C2]) transmitted from the C terminal station 3 is input to the P2 of each of the WSSs 131 and 132 through the amplifier 105 and the couplers 102 and 122.

The WDM optical signal ([A1][A2]) is input to the P1 of the WSS 131 from the coupler 121. The optical signal ([C2]) is input to the P2 of the WSS 131 from the coupler 122. The WSS 131 splits the optical signal ([A1]) from the WDM optical signal ([A1][A2]) input to the P1, multiplexes the split optical signal ([A1]) and the optical signal ([C2]) input to the P2, and then generates a WDM optical signal ([A1][C2]). The generated WDM optical signal ([A1][C2]) is output to the P1 of the switch 111 from the P3 of the WSS 131. The WSS 132 splits the optical signal ([A2]) from the WDM optical signal ([A1][A2]) input to the P1, and then outputs the optical signal ([A2]) to the P2 of the switch 111 from the P3 of the WSS 132.

In FIG. 2, the switch 111 is controlled in such a way that the P1 and P3 thereof are connected, and the P2 and P4 are connected. The WDM optical signal ([A1][C2]) is transmitted to outside (a direction of the B terminal station 2) through the switch 111, the switch 113, and the amplifier 104. The optical signal ([A2]) is transmitted to outside (a direction of the C terminal station 3) through the switch 111, the switch 112, and the amplifier 106.

In this way, the optical signal ([A1]) included in the WDM optical signal ([A1][A2]) transmitted by the A terminal station 1, and the optical signal ([C2]) transmitted by the C terminal station 3, are transmitted to the B terminal station 2 being a destination of the respective optical signals. Moreover, the optical signal ([A2]) included in the WDM optical signal ([A1][A2]) is transmitted to the C terminal station 3 being a destination of the optical signal.

1-2. A Case where Only the WSS 131 is Broken

Figure 3:
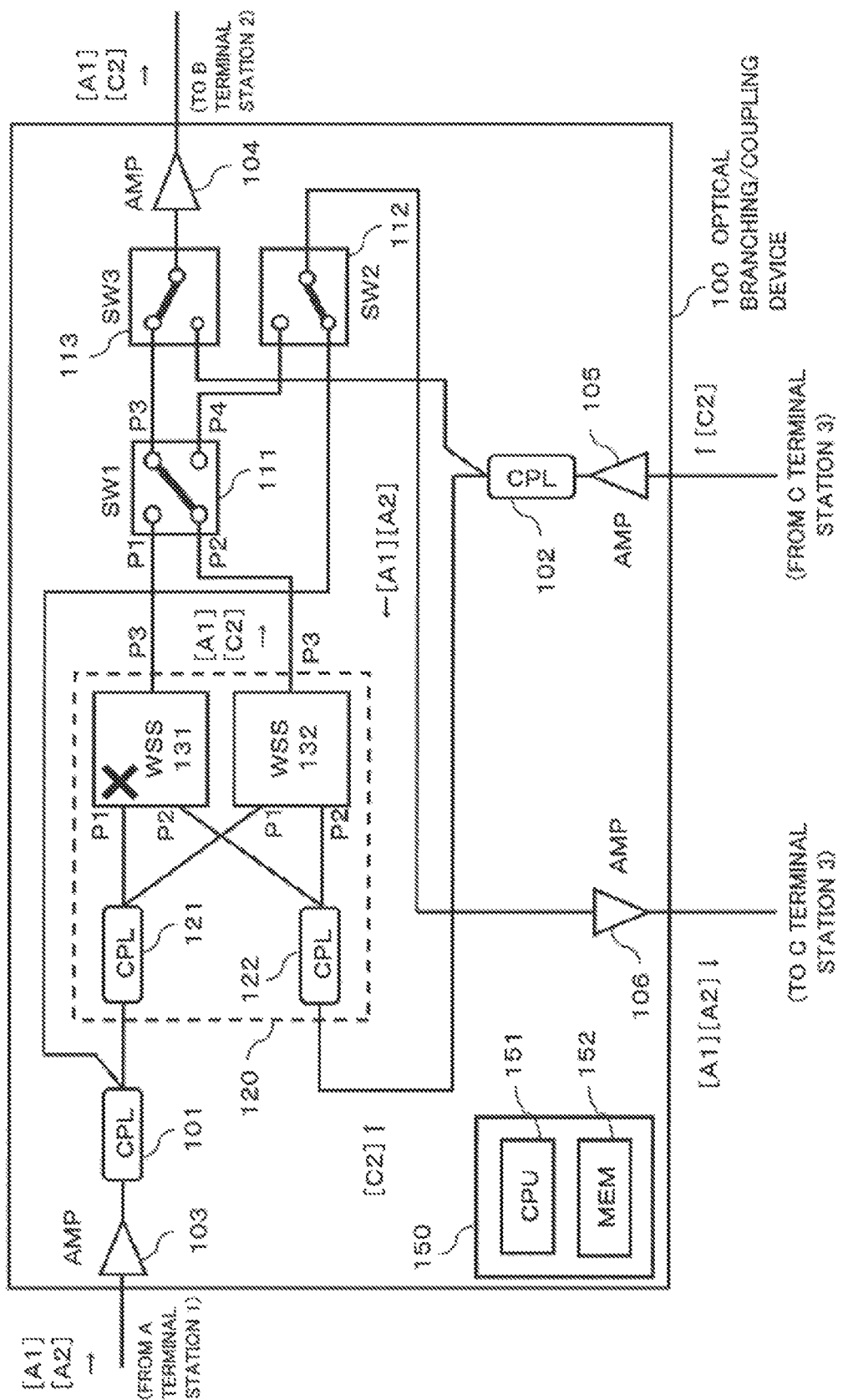

FIG. 3 is a block diagram illustrating an operation example of the optical branching/coupling device 100 when the WSS 131 is broken, and the WSS 132 is normally operating. A mark "x" (a cross) of the WSS 131 indicates that the WSS 131 is broken. Referring to FIG. 3, the WDM optical signal ([A1][A2]) transmitted from the A terminal station 1 is input to the optical branching/coupling device 100, and input to the P1 of each of the WSSs 131 and 132 through the amplifier 103, and the couplers 101 and 121. The optical signal ([C2]) transmitted from the C terminal station 3 is input to the P2 of each of the WSSs 131 and 132 through the amplifier 105, and the couplers 102 and 122. When the WSS 131 is broken, the WSS 132 and the switches 111 to 113 are set in such a way as to achieve the following operation.

The WDM optical signal ([A1][A2]) is input to the P1 of the WSS 132 from the coupler 121. The optical signal ([C2]) is input to the P2 of the WSS 132 from the coupler 122. The WSS 132 multiplexes the optical signal ([A1]) split from the WDM optical signal ([A1][A2]) input to the P1, and the optical signal ([C2]) input to the P2, and then generates a WDM optical signal ([A1][C2]). The generated WDM optical signal ([A1][C2]) is output to the P2 of the switch 111 from the P3 of the WSS 132. In FIG. 3, the switch 111 is controlled in such a way that the P2 and P3 thereof are connected. As a result, the WDM optical signal ([A1][C2])

is transmitted to outside (the B terminal station 2) through the switch 111, the switch 113, and the amplifier 104.

On the other hand, in FIG. 3, the switch 112 is switched in such a way that the WDM optical signal ([A1][A2]) branched at the coupler 101 passes through the switch 112. As a result, the WDM optical signal ([A1][A2]) is transmitted to outside (the C terminal station 3) through the switch 112 and the amplifier 106. In this case, when receiving the WDM optical signal ([A1][A2]), the C terminal station 3 splits and then uses only the optical signal ([A2]) a destination of which is the C terminal station 3.

In this way, the optical signal ([A1]) and the optical signal ([C2]) are both transmitted to the B terminal station 2 being a destination. Moreover, the optical signal ([A2]) is transmitted to the C terminal station 3, remaining as the WDM optical signal ([A1][A2]). Thus, even when the WSS 131 is broken, the B terminal station 2 can receive the WDM optical signal ([A1][C2]), and the C terminal station 3 can receive the WDM optical signal ([A2]).

1-3. A Case where Only the WSS 132 is Broken

Figure 4:
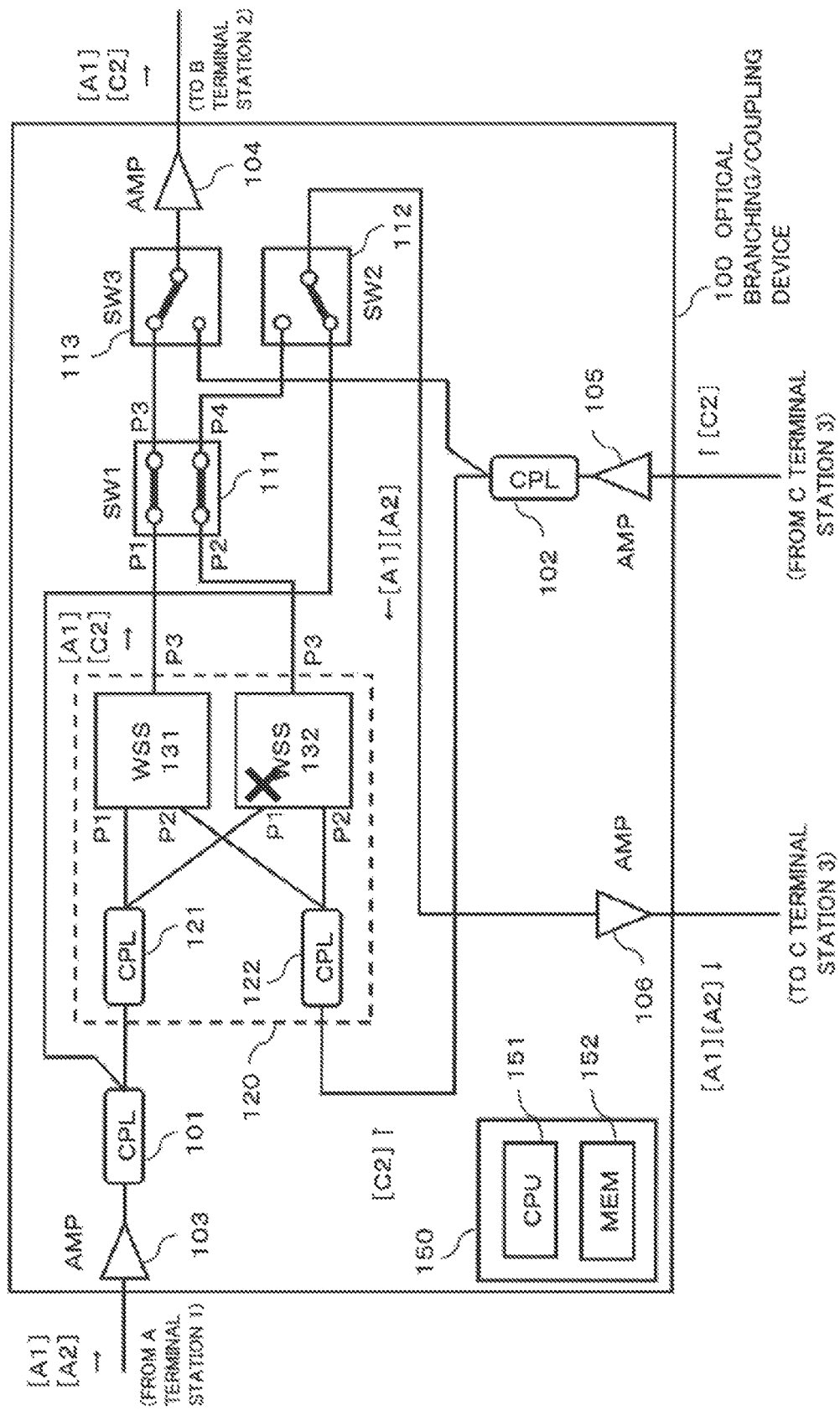

FIG. 4 is a block diagram illustrating an operation example of the optical branching/coupling device 100 when the WSS 132 is broken, and the WSS 131 is normally operating. A mark "x" of the WSS 132 indicates that the WSS 132 is broken. Referring to FIG. 4, the WDM optical signal ([A1][A2]) transmitted from the A terminal station 1 is input to the optical branching/coupling device 100, and input to the P1 of each of the WSSs 131 and 132 through the amplifier 103, and the couplers 101 and 121. The optical signal ([C2]) transmitted from the C terminal station 3 is input to the P2 of each of the WSSs 131 and 132 through the amplifier 105, and the couplers 102 and 122. When the WSS 132 is broken, the WSS 131 and the switches 111 to 113 are set in such a way as to achieve the following operation.

The WDM optical signal ([A1][A2]) is input to the P1 of the WSS 131 from the coupler 121. The optical signal ([C2]) is input to the P2 of the WSS 131 from the coupler 122. The WSS 131 multiplexes the optical signal ([A1]) split from the WDM optical signal ([A1][A2]) input to the P1, and the optical signal ([C2]) input to the P2, and then generates a WDM optical signal ([A1][C2]). The generated WDM optical signal ([A1][C2]) is output to the P1 of the switch 111 from the P3 of the WSS 131. In FIG. 4, the switch 111 is controlled in such a way that the P1 and P3 thereof are connected. As a result, the WDM optical signal ([A1][C2]) is transmitted to outside (the B terminal station 2) through the switch 111, the switch 113, and the amplifier 104.

On the other hand, in FIG. 4, the switch 112 is switched in such a way that the WDM optical signal ([A1][A2]) branched at the coupler 101 passes through the switch 112, as in FIG. 3. As a result, the WDM optical signal ([A1][A2]) is transmitted to outside (the C terminal station 3) through the switch 112 and the amplifier 106. When receiving the WDM optical signal ([A1][A2]), the C terminal station 3 splits and then uses only the optical signal ([A2]) a destination of which is the C terminal station 3.

In this way, in the case of FIG. 4 as well as in FIG. 3, the optical signal ([A1]) and the optical signal ([C2]) are both transmitted to the B terminal station 2 being a destination. Moreover, the optical signal ([A2]) is transmitted to the C terminal station 3, remaining as the WDM optical signal ([A1][A2]). In other words, even when the WSS 132 is broken, the B terminal station 2 can receive WDM optical signals on the wavelength bands A1 and C2, and the C terminal station 3 can receive an optical signal on the wavelength band A2.

1-4. A Case where the WSS 131 and the WSS 132 are Both Broken

Figure 5:
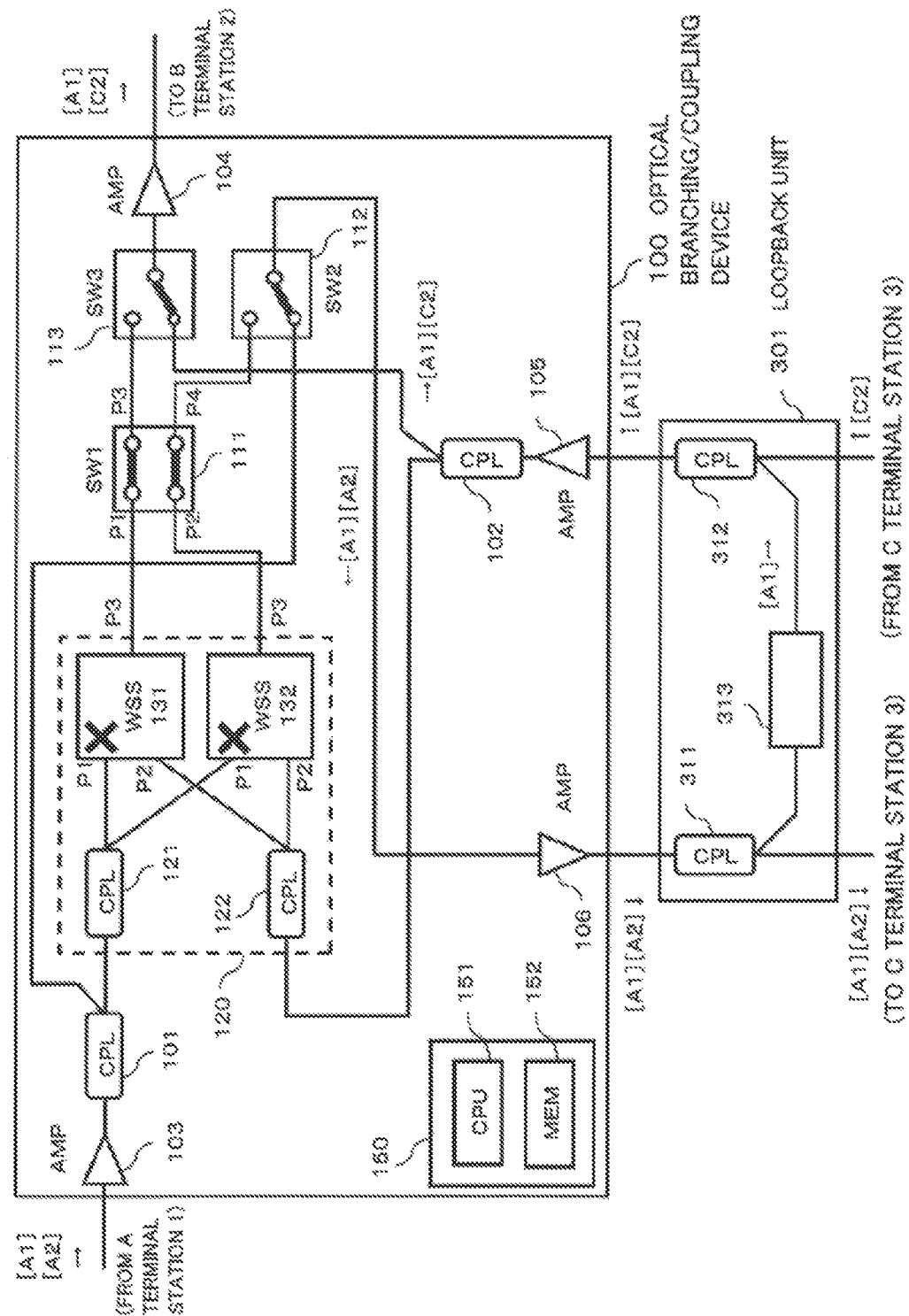

FIG. 5 is a block diagram illustrating an operation example of the optical branching/coupling device 100 when the WSS 131 and the WSS 132 are both broken. Referring to FIG. 5, the WDM optical signal ([A1][A2]) transmitted from the A terminal station 1 is input to the optical branching/coupling device 100, and transmitted to outside of the optical branching/coupling device 100 through the amplifier 103, the coupler 101, the switch 112, and the amplifier 106.

Herein, in the example embodiment illustrated in FIG. 5, a loopback unit 301 is disposed between the optical branching/coupling device 100 and the C terminal station 3. The loopback unit 301 includes a function of performing loopback, to the optical branching/coupling device 100, the optical signal ([A1]) transmitted from the optical branching/coupling device 100. The loopback unit 301 includes couplers 311 and 312, and a filter 313. The couplers 311 and 312 are 1×2 optical couplers. The coupler 311 splits an input optical signal into two, then outputs one of branched optical signals to outside of the loopback unit 301, and outputs another to the filter 313. The filter 313 is an optical filter that transmits only an optical signal on the wavelength band A1, and blocks optical signals on other bands. In other words, the filter 313 transmits and then outputs, to the coupler 312, the optical signal ([A1]), and blocks the optical signal ([A2]) and the optical signal ([C2]). The coupler 312 couples the optical signal ([C2]) input from outside of the loopback unit 301 to the optical signal ([A1]) input from the filter 313, and then outputs a coupled optical signal to the optical branching/coupling device 100.

Fused fiber couplers or optical waveguide couplers can be used as the couplers 311 and 312. A branching ratio of each of the couplers 311 and 312 is, but not limited to, for example, 1:1. An optical waveguide coupler or an optical fiber Bragg grating can be used as the filter 313.

Because the filter 313 blocks a band of the optical signal ([A2]), the optical signal ([A1]) is output from the filter 313. The optical signal ([A1]) is coupled to the optical signal ([C2]) transmitted from the C terminal station 3 in the coupler 312, and output to the optical branching/coupling device 100 from the loopback unit 301 as the WDM optical signal ([A1][C2]).

The WDM optical signal ([A1][C2]) output from the loopback unit 301 is transmitted to outside (i.e., the B terminal station 2) of the optical branching/coupling device 100 through the amplifier 105, the coupler 102, the switch 113, and the amplifier 104 of the optical branching/coupling device 100.

When the WDM optical signal ([A1][A2]) is input to the loopback unit 301 from the optical branching/coupling device 100, the coupler 311 splits the WDM optical signal ([A1][A2]), then transmits one of branched WDM optical signal to outside of the loopback unit 301, and outputs another to the filter 313. The WDM optical signal ([A1][A2]) transmitted to outside of the loopback unit 301 is received in the C terminal station 3. When receiving the WDM optical signal ([A1][A2]), the C terminal station 3 splits and then uses only the optical signal ([A2]) a destination of which is the C terminal station 3.

Thus, even when the WSSs 131 and 132 are both broken, the optical signal ([A1]) transmitted by the A terminal station 1, and the optical signal ([C2]) transmitted by the C terminal station 3 are transmitted, by using the loopback unit 301, to the B terminal station 2 being a destination of the respective optical signals. Moreover, the optical signal ([A2]) transmitted by the A terminal station 1 is transmitted to the C terminal station 3, remaining as the WDM optical signal ([A1][A2]). Therefore, even when the WSSs 131 and 132 are broken, the B terminal station 2 can receive the WDM optical signal ([A1][C2]), and the C terminal station 3 can receive the optical signal ([A2]).

The loopback unit 301 causes a loss to the optical signal ([A2]) and the optical signal ([C2]) transmitted and received between the optical branching/coupling device 100 and the C terminal station 3, but does not affect a wavelength band of an optical signal transmitted and received between the optical branching/coupling device 100 and the C terminal station 3. Therefore, the loopback unit 301 can be connected as illustrated in FIG. 5, in the cases described with FIGS. 2 to 4 as well.

Note that, in the cases of FIGS. 3 and 4, the WDM optical signal ([A1][C2]) is performed loopback to the optical branching/coupling device 100 from the loopback unit 301. As a result, the optical signal ([A1]) is input to the WSSs 131 and 132 from both of the couplers 121 and 122. In this case, a WSS being in operation may be controlled in such a way as to generate the WDM optical signal ([A1][C2]) to be transmitted to the B terminal station 2, by use of only one optical signal ([A1]) input from either one of the couplers 121 or 122.

In the present example embodiment, the loopback unit 301 is disposed between the optical branching/coupling device 100 and the C terminal station 3. However, the loopback unit 301 may be included in the optical branching/coupling device 100 or the C terminal station 3. The loopback unit 301 may be a device independent of the optical branching/coupling device 100 and the C terminal station 3.

Modification Example of Loopback Unit

In the loopback unit 301, the filter 313 may be omitted, and two multiplexers/demultiplexers being capable of multiplexing and demultiplexing the wavelength band of the optical signal ([A1]) and light on other wavelength bands may be disposed instead of the couplers 311 and 312. In this configuration, a common port of each of the two multiplexers/demultiplexers is connected to the optical branching/coupling device 100, and ports that split the optical signal ([A1]) are connected to each other. Ports of the two multiplexers/demultiplexers that split wavelength bands other than the wavelength band of the optical signal ([A1]) are connected to the C terminal station 3. With such a configuration as well, only the optical signal ([A1]) can be performed loopback to the optical branching/coupling device 100, and the optical signal ([A2]) and the optical signal ([C2]) can be transmitted and received between the optical branching/coupling device 100 and the C terminal station 3. Additionally, with this configuration, reduction in a loss of the loopback unit 301 can be expected, as compared with a case where the couplers 311 and 312 are used.

Modification Example of First Example Embodiment

Figure 6:
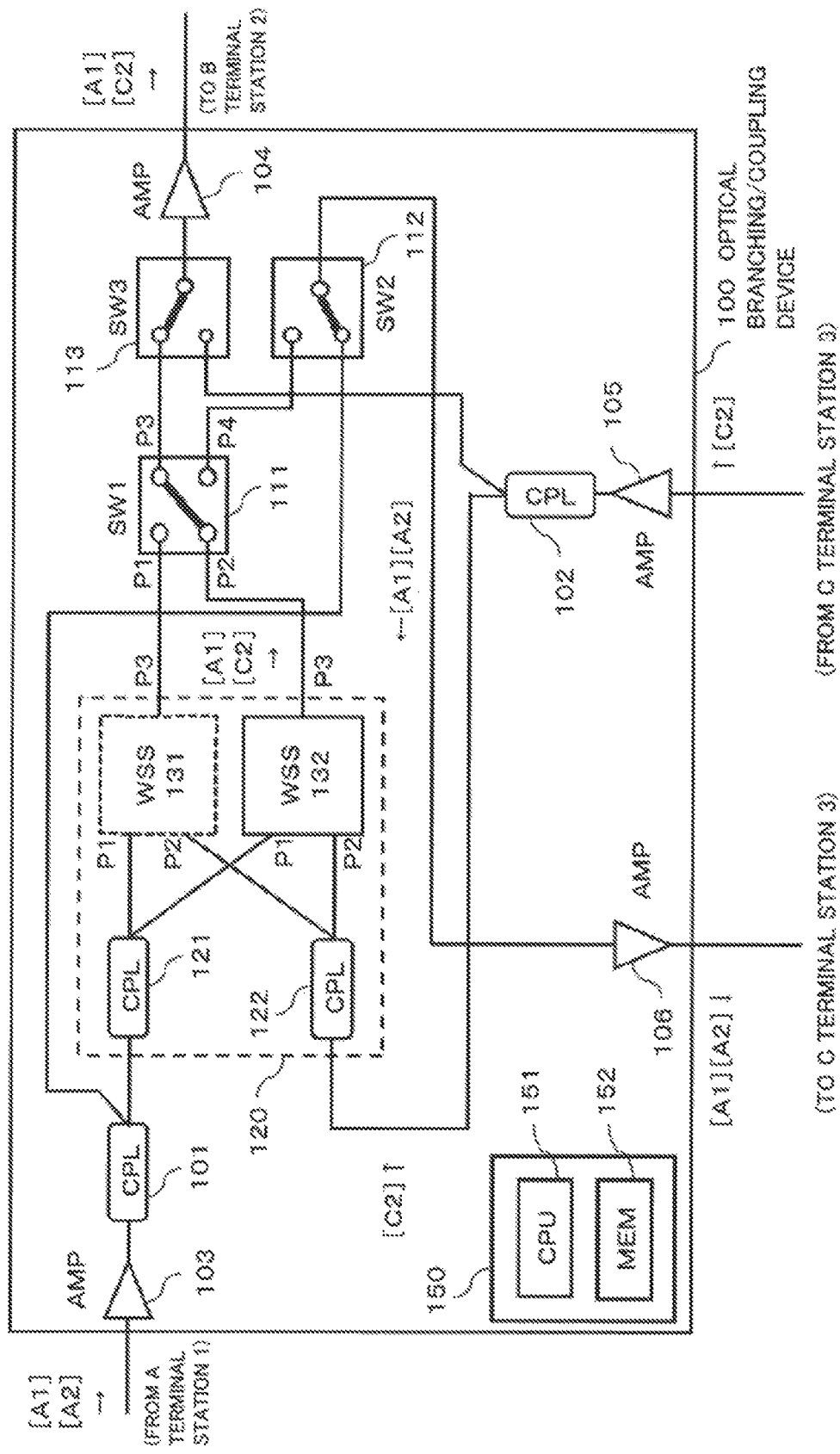

FIG. 6 is a block diagram illustrating a modification example of the optical branching/coupling device 100 according to the first example embodiment. Even when the WSSs 131 and 132 are both normal, the optical branching/coupling device 100 can operate by use of only one of the WSSs, and keep another WSS standing by. FIG. 6 illustrates that the WSS 131 is standing by. When the WSS 131 is standing by, the optical branching/coupling device 100 performs an operation similar to that in the case described with FIG. 3 where the WSS 131 is broken. In such an operation, it is not necessary to perform control for a WSS standing by. Moreover, by cutting off supply of electric power to a WSS standing by, it is possible to expect reduction in power consumption of the optical branching/coupling device 100, and prolongation of a life of a WSS being in a stand-by state. Similarly, the WSS 132 may be kept standing by.

As described above, in the optical branching/coupling device 100, optical signals transmitted from the A terminal station 1 and the C terminal station 3 reach a terminal station being a destination, even when one or both of the WSSs 131 and 132 are broken. Thus, a degree of reliability required for a single WSS is eased, and it becomes possible to apply the optical branching/coupling device 100 to a submarine cable system for which a long-period performance guarantee is required. In other words, the optical branching/coupling device 100 according to the first example embodiment can provide an optical branching/coupling device having high reliability.

Second Example Embodiment

There is a WSS having two input ports P1 and P2 that includes a function of conducting all wavelengths, regarding only one of optical signals input from two input ports, when electric power is not supplied to a WSS (when electric power is off). A configuration that uses such a WSS, and makes the coupler 102 and the switch 113 according to the first example embodiment unnecessary by turning off electric power of a broken WSS is described below.

Figure 7:
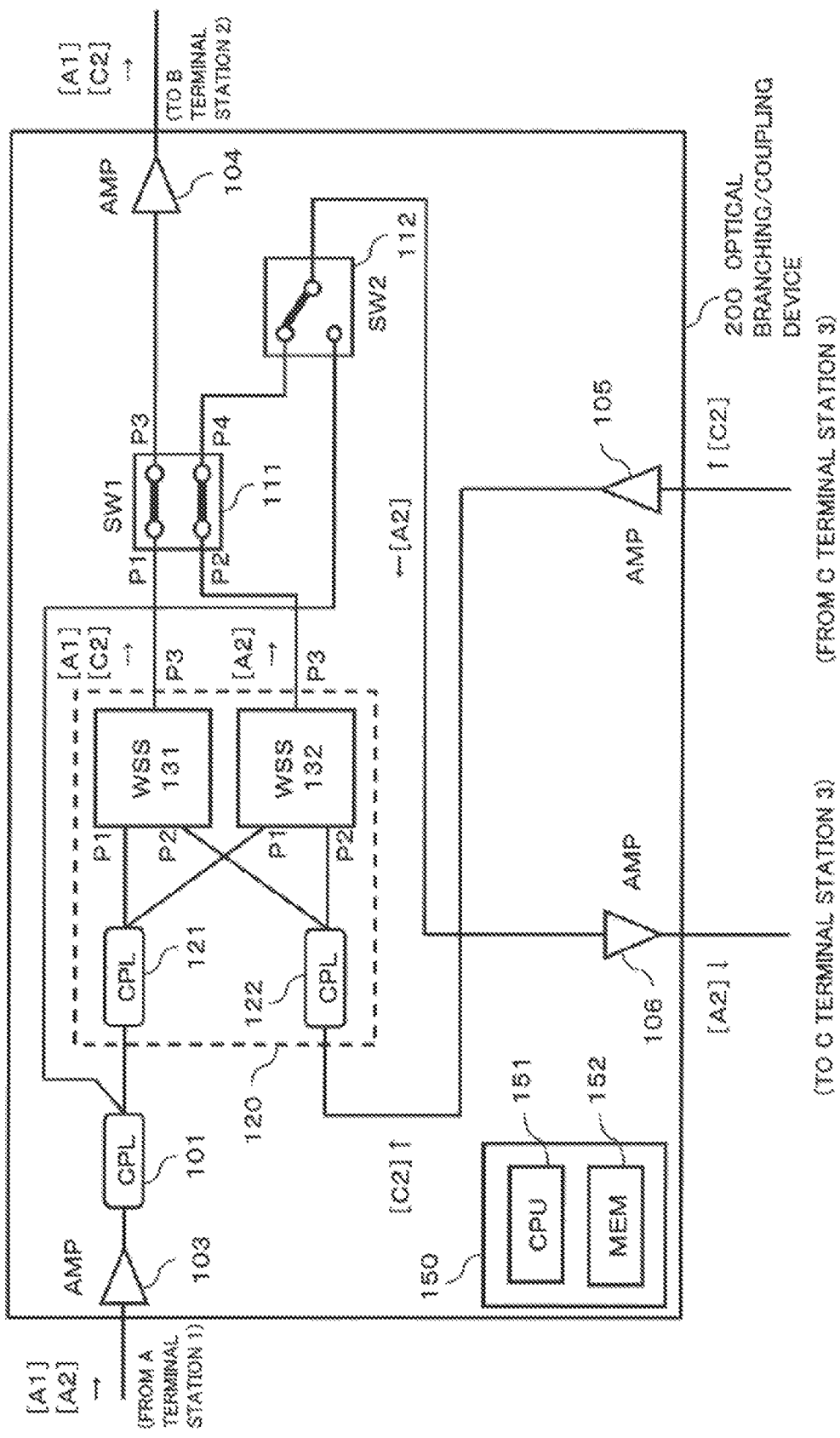

FIG. 7 is a block diagram illustrating a configuration example of an optical branching/coupling device 200 according to a second example embodiment of the present invention. As compared with the optical branching/coupling device 100 illustrated in FIG. 2, the optical branching/coupling device 200 differs in that the optical branching/coupling device 200 does not include a coupler 102 and a switch 113. Other components are similar to those in the optical branching/coupling device 100, and therefore, a description overlapping that in the first example embodiment is omitted accordingly.

2-1. A Case where a WSS 131 and a WSS 132 are Normally Operating

Referring to FIG. 7, an operation of the optical branching/coupling device 200 when the WSS 131 and the WSS 132 are both normally operating is described. A WDM optical signal ([A1][A2]) transmitted from an A terminal station 1 is input to the optical branching/coupling device 200, and input to a P1 of each of the WSSs 131 and 132 through an amplifier 103, and couplers 101 and 121. An optical signal ([C2]) transmitted from a C terminal station 3 is input to a P2 of each of the WSSs 131 and 132 through an amplifier 105 and a coupler 122.

The WDM optical signal ([A1][A2]) is input to the P1 of the WSS 131 from the coupler 121. The optical signal ([C2]) is input to the P2 of the WSS 131 from the coupler 122. The WSS 131 multiplexes the optical signal ([A1]) split from the WDM optical signal input to the P1, and the optical signal ([C2]) input to the P2, and then generates a WDM optical signal ([A1][C2]). The generated WDM optical signal ([A1][C2]) is output to a P1 of a switch 111 from a P3 of the WSS 131. The WDM optical signal ([A1][C2]) is transmitted to outside (a direction of the B terminal station 2) through a P3 of the switch 111, and an amplifier 104.

The WSS 132 outputs an optical signal ([A2]) split from the WDM optical signal ([A1][A2]) input to the P1, to a P2 of the switch 111 from a P3 of the WSS 132. The optical signal ([A2]) is transmitted to outside (a direction of the C terminal station 3) through a P4 of the switch 111, a switch 112, and an amplifier 106.

Thus, in the second example embodiment, when the WSSs 131 and 132 are normal, the optical signal ([A1]) transmitted by the A terminal station 1, and the optical signal ([C2]) transmitted by the C terminal station 3, are transmitted to the B terminal station 2 being a destination of the respective optical signals. Moreover, the optical signal ([A2]) is transmitted to the C terminal station 3 being a destination of the optical signal.

2-2. A Case where Only the WSS 131 is Broken

Figure 8:
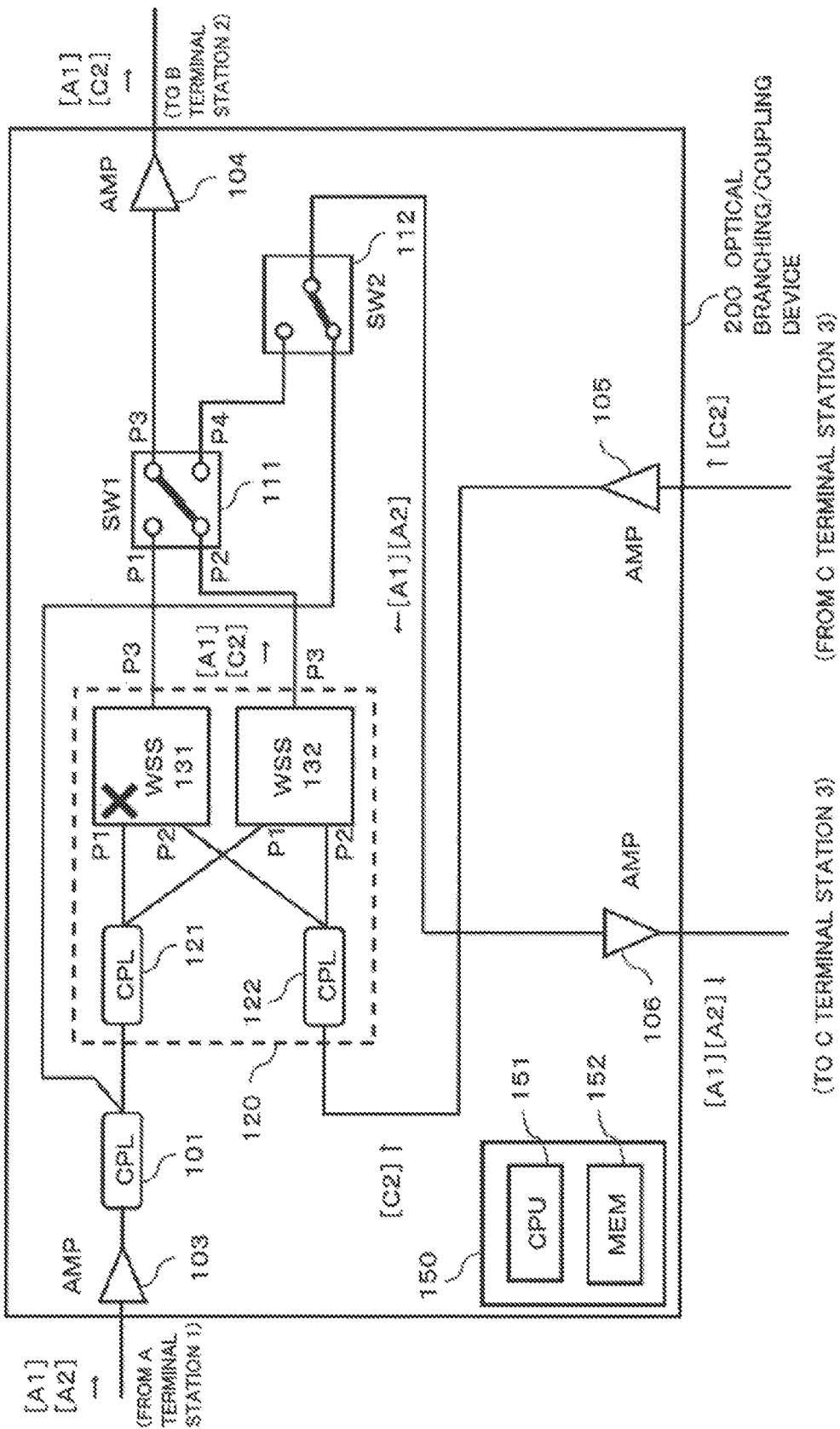

FIG. 8 is a block diagram illustrating an operation example of the optical branching/coupling device 200 when the WSS 131 is broken, and the WSS 132 is normally operating. When the WSS 131 is broken, the WSS 132 and the switches 111 and 112 are set in such a way as to achieve the following operation, as in FIG. 3 in the first example embodiment.

The WSS 132 multiplexes the optical signal ([A1]) split from the WDM optical signal ([A1][A2]) input to the P1, and the optical signal ([C2]) input to the P2, and then generates a WDM optical signal ([A1][C2]). The generated WDM optical signal ([A1][C2]) is output to the P2 of the switch 111 from the P3 of the WSS 132. The WDM optical signal ([A1][C2]) is transmitted to outside (the B terminal station 2) through the switch 111 and the amplifier 104.

On the other hand, in FIG. 8, the switch 112 is switched in such a way that the WDM optical signal ([A1][A2]) branched at the coupler 101 passes through the switch 112. As a result, the WDM optical signal ([A1][A2]) is transmitted to outside (the C terminal station 3) through the switch 112 and the amplifier 106. In this case, when receiving the WDM optical signal ([A1][A2]), the C terminal station 3 splits and then uses only the optical signal ([A2]) a destination of which is the C terminal station 3.

In this way, even when the WSS 131 is broken in the second example embodiment, the B terminal station 2 can receive the WDM optical signal ([A1][C2]), and the C terminal station 3 can receive the WDM optical signal ([A2]).

2-3. A Case where Only the WSS 132 is Broken

Figure 9:
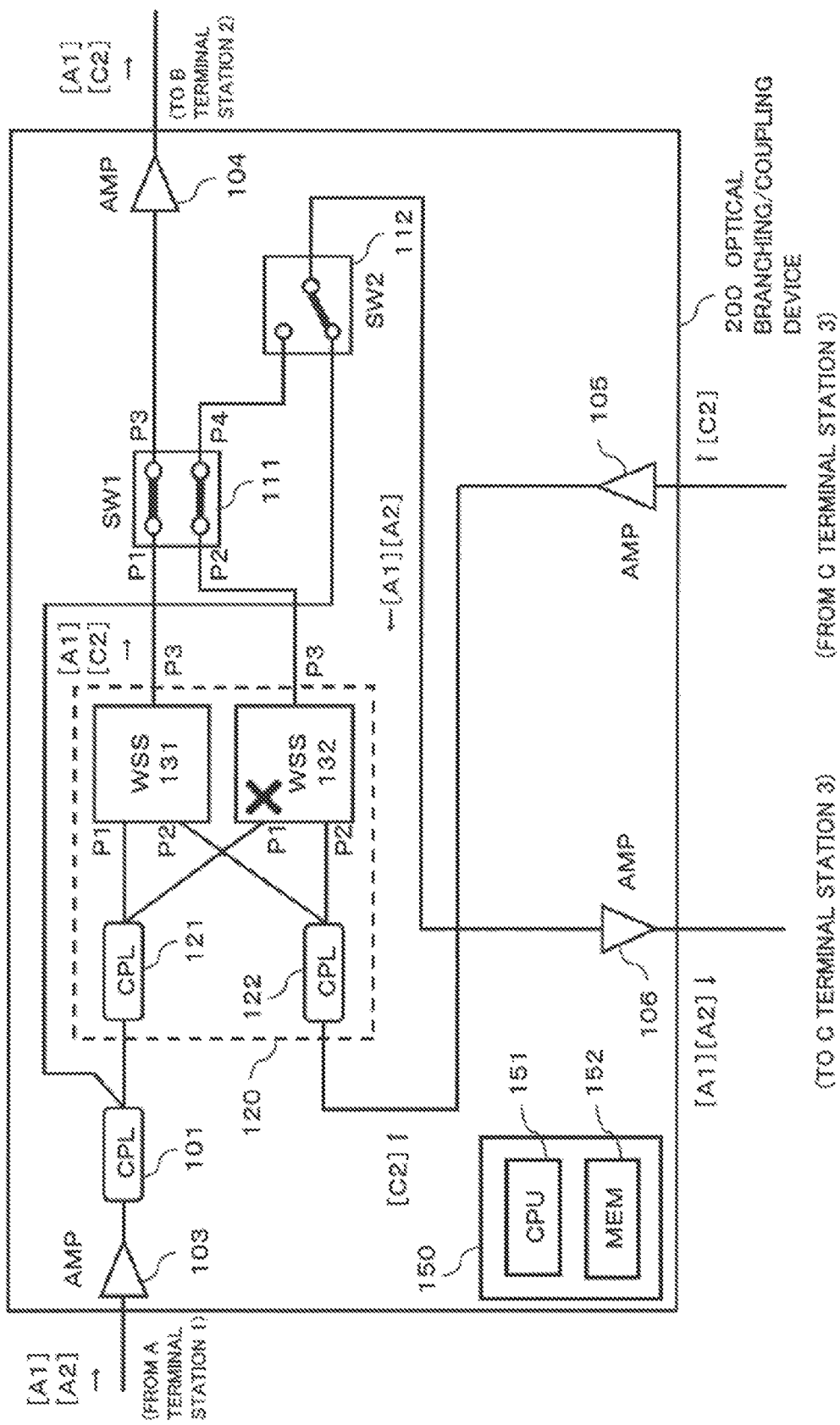

FIG. 9 is a block diagram illustrating an operation example of the optical branching/coupling device 200 when the WSS 132 is broken, and the WSS 131 is normally operating. When the WSS 132 is broken, the WSS 131 and the switches 111 and 112 are set in such a way as to function as follows, as in FIG. 4 in the first example embodiment.

The WSS 131 multiplexes the optical signal ([A1]) split from the WDM optical signal ([A1][A2]) input to the P1, and the optical signal ([C2]) input to the P2, and then generates a WDM optical signal ([A1][C2]). The generated WDM optical signal ([A1][C2]) is output to the P1 of the switch 111 from the P3 of the WSS 131. The WDM optical signal ([A1][C2]) is transmitted to outside (the B terminal station 2) through the switch 111 and the amplifier 104.

On the other hand, in FIG. 9, the switch 112 is switched in such a way that the WDM optical signal ([A1][A2]) branched at the coupler 101 passes through the switch 112, as in FIG. 8. As a result, the WDM optical signal ([A1][A2]) is transmitted to outside (the C terminal station 3) through the switch 112 and the amplifier 106. When receiving the WDM optical signal ([A1][A2]), the C terminal station 3 splits and then uses only the optical signal ([A2]) a destination of which is the C terminal station 3.

In this way, even when the WSS 132 is broken in the second example embodiment, the B terminal station 2 can receive the WDM optical signal ([A1][C2]), and the C terminal station 3 can receive the WDM optical signal ([A2]).

Figure 10:
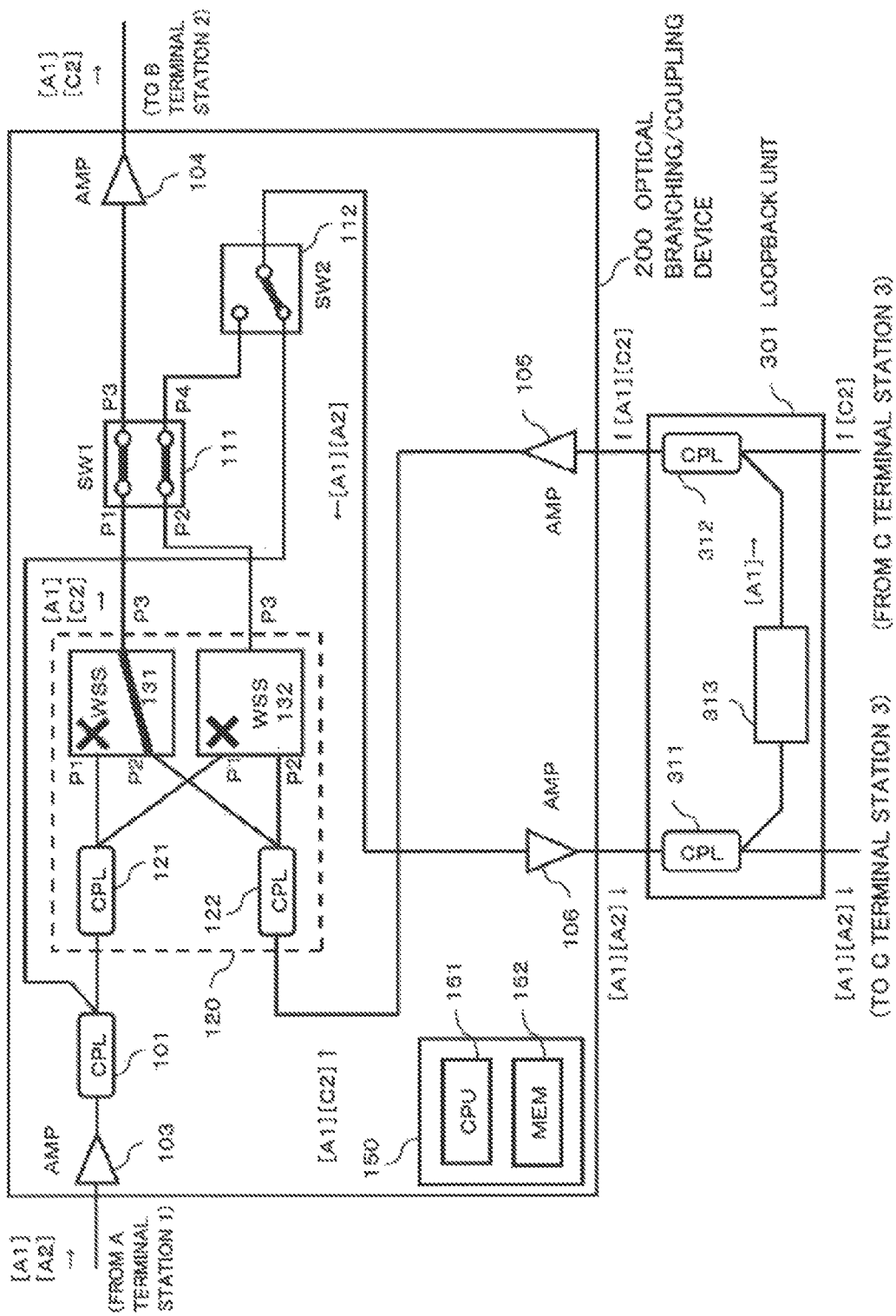

2-4. First Operation Example in a Case where the WSS 131 and the WSS 132 are Both Broken FIG. 10 is a block diagram illustrating a first operation example of the optical branching/coupling device 200 when the WSS 131 and the WSS 132 are both broken. In the WSS 131 described in FIG. 10, an optical signal input to the P2 when electric power is off is output from the P3 regardless of a wavelength band. Moreover, in the example embodiment illustrated in FIG. 10, a loopback unit 301 similar to that described in FIG. 5 in the first example embodiment is disposed between the optical branching/coupling device 200 and the C terminal station 3. The loopback unit 301 includes a function of performing loopback, to the optical branching/coupling device 200, the optical signal ([A1]) transmitted from the optical branching/coupling device 200.

When the WSSs 131 and 132 are broken, supply of electric power to the WSSs 131 and 132 is stopped, and the switches 111 and 112 are set in such a way that an optical signal is propagated as follows.

The WDM optical signal ([A1][A2]) transmitted from the A terminal station 1 is input to the optical branching/coupling device 200, and input to the loopback unit 301 through the amplifier 103, the coupler 101, the switch 112, and the amplifier 106. The WDM optical signal ([A1][A2]) input to the loopback unit 301 branches at a coupler 311, one of branched WDM optical signal is output to the C terminal station 3, and another is output to a filter 313. The filter 313 outputs only the optical signal ([A1]) to a coupler 312.

The optical signal ([C2]) transmitted from the C terminal station 3 is input to the loopback unit 301 and, in the coupler 312, coupled to the optical signal ([A1]) output from the coupler 312. The loopback unit 301 outputs, to the optical branching/coupling device 200, the WDM optical signal ([A1][C2]) coupled in the coupler 312. In the optical branching/coupling device 200, the WDM optical signal ([A1][C2]) input from the loopback unit 301 is input to the P2 of the WSS 131 through the amplifier 105 and the coupler 122. Herein, because electric power of the WSS 131 is turned off, only an optical signal input to the P2 of the WSS 131 is output from the P3 of the WSS 131 regardless of a wavelength band. In other words, the WDM optical signal ([A1][C2]) is output from the P3 of the WSS 131. Then, the WDM optical signal ([A1][C2]) output from the WSS 131 is transmitted to outside (the B terminal station 2) through the switch 111 and the amplifier 104.

Thus, even when the WSSs 131 and 132 are broken, the optical signal ([A1]) and the optical signal ([C2]) are transmitted to the B terminal station 2 being a destination of the respective optical signals, by using the loopback unit 301, and the WSS 131 through which all wavelengths are transmitted between particular input/output ports when electric power is off. Moreover, the optical signal ([A2]) is transmitted to the C terminal station 3, remaining as the WDM optical signal ([A1][A2]). Therefore, even when the WSSs 131 and 132 are broken, the B terminal station 2 can receive the WDM optical signal ([A1][C2]), and the C terminal station 3 can receive the optical signal ([A2]), unless a function by which all wavelengths are transmitted between particular input/output ports, when electric power of the WSS 131 is off, is lost. In addition, in contrast to the optical branching/coupling device 100, the optical branching/coupling device 200 can achieve the above-described function, even when the WSS 131 and the WSS 132 are both broken, without including the coupler 102 and the switch 113.

Note that, in the present example embodiment as well, the loopback unit 301 may be included in the optical branching/coupling device 200 or the C terminal station 3. The loopback unit 301 may be a device independent of the optical branching/coupling device 200 and the C terminal station 3. "Modification Example of Loopback Unit" described in the first example embodiment is applicable to the present example embodiment as well.

Figure 11:
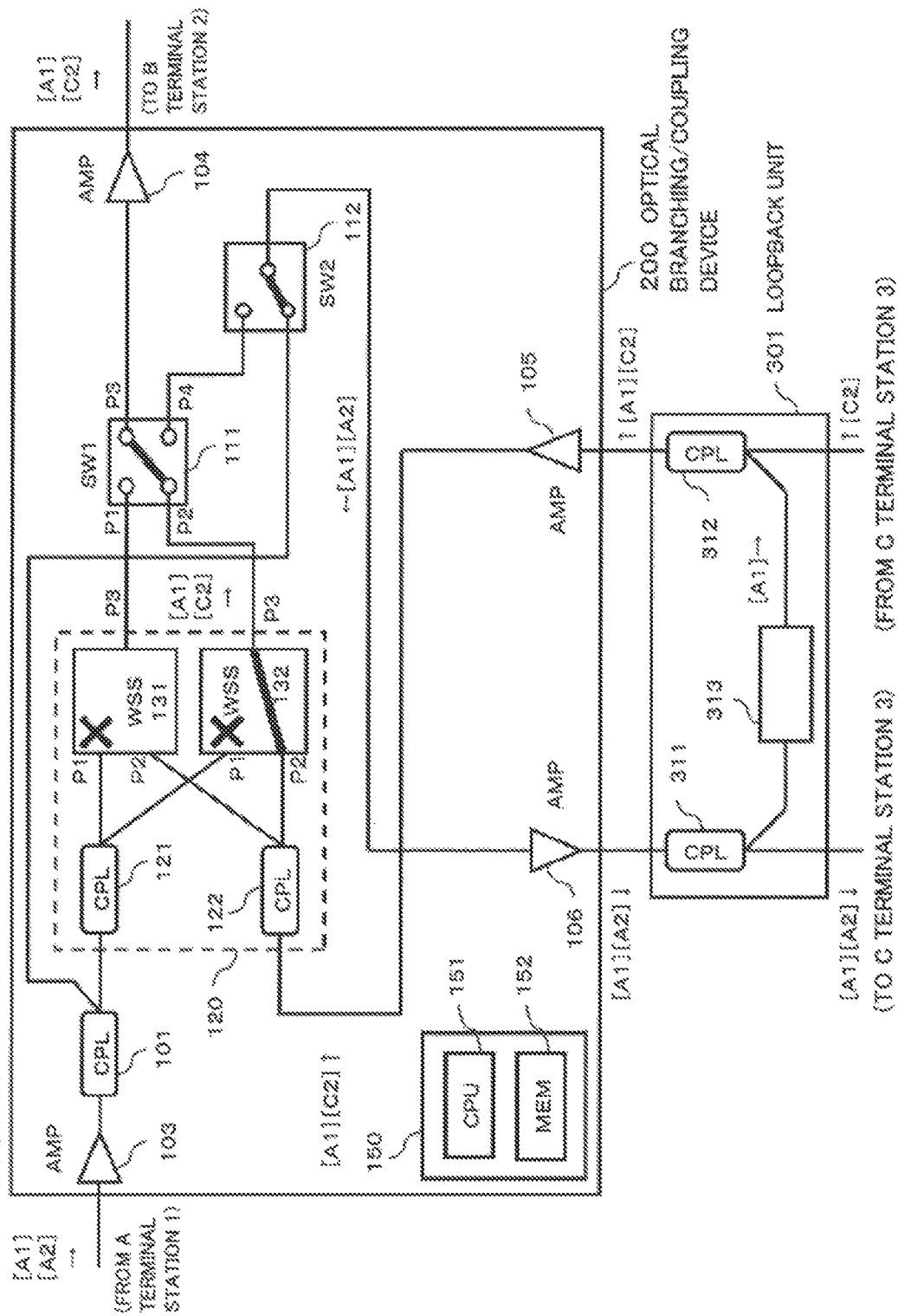

2-5. Second Operation Example in a Case where the WSS 131 and the WSS 132 are Both Broken FIG. 11 is a block diagram illustrating a second operation example of the optical branching/coupling device 200 when the WSS 131 and the WSS 132 are both broken. In the WSS 132 described in FIG. 11, an optical signal input to the P2 when electric power is off is output from the P3 of the WSS 132 regardless of a wavelength band. Thus, in FIG. 11, the switch 111 is set in such a way that the P2 and the P3 are connected to each other, in order to transmit the WDM optical signal ([A1][C2]) output from the P3 of the WSS 132 to the B terminal station 2. Other operations are similar to those in FIG. 10. In other words, in FIG. 11, the WDM optical signal ([A1][C2]) generated in the loopback unit 301 is transmitted to the B terminal station 2 through the amplifier 105, the coupler 122, the WSS 132, the switch 111, and the amplifier 104.

Thus, even in the second operation example when the WSSs 131 and 132 are broken, the B terminal station 2 can receive the WDM optical signal ([A1][C2]), unless a function by which all wavelengths are transmitted between particular input/output ports, when electric power of the WSS 132 is off, is lost. Moreover, the C terminal station 3 can receive the optical signal ([A2]).

Figure 12:
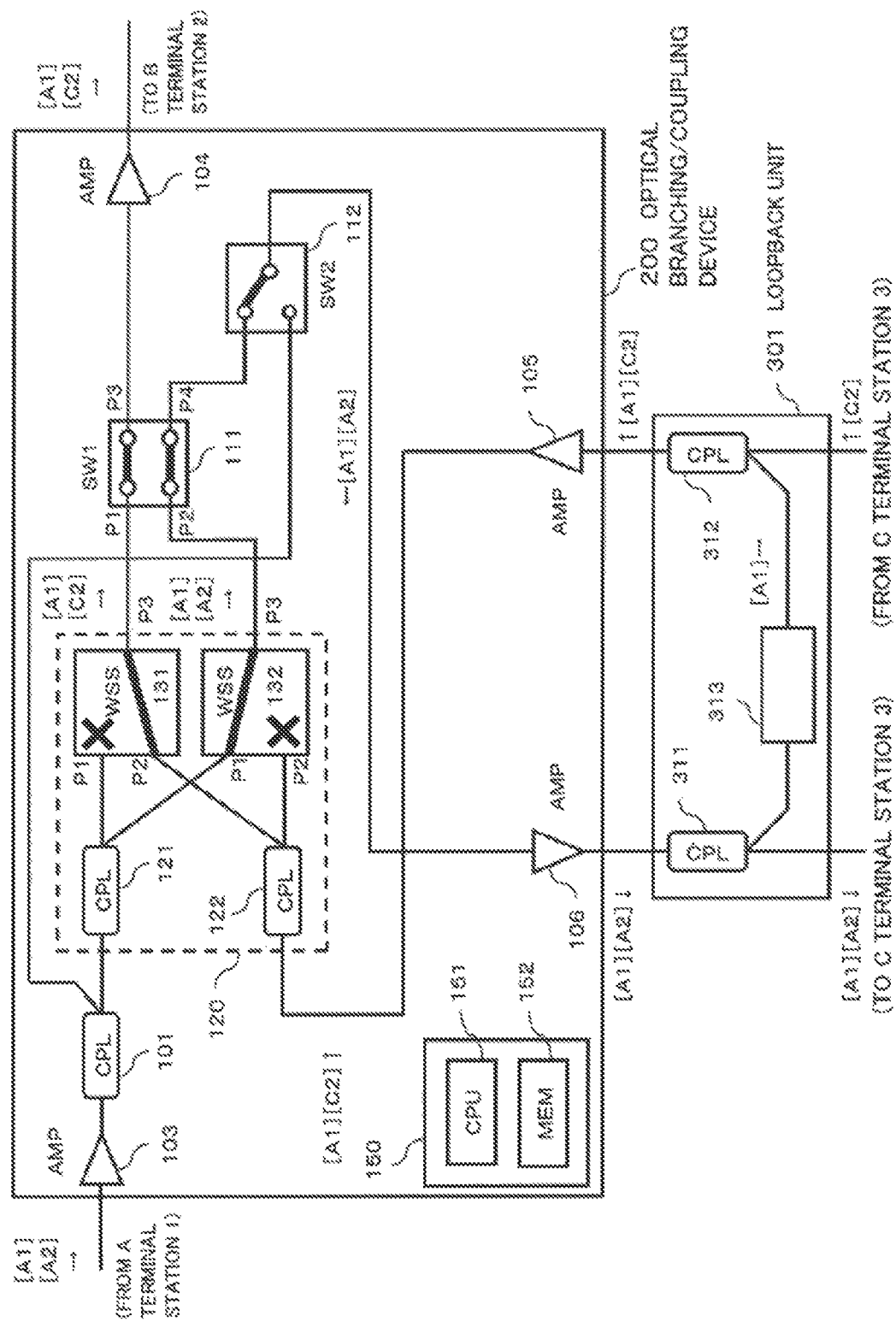

2-6. Third Operation Example in a Case where the WSS 131 and the WSS 132 are Both Broken FIG. 12 is a block diagram illustrating a third operation example of the optical branching/coupling device 200 when the WSS 131 and the WSS 132 are both broken. In FIG. 12, an optical signal input to the P2 of the WSS 131 when electric power of the WSS 131 is off is output from the P3 of the WSS 131 regardless of a wavelength band. Moreover, an optical signal input to the P1 of the WSS 132 when electric power of the WSS 132 is off is output from the P3 of the WSS 132 regardless of a wavelength band. Thus, in FIG. 12, the switches 111 and 112 are set in such a way that the WDM optical signal ([A1][C2]) is transmitted in a direction of the B terminal station 2, and the WDM optical signal ([A1][A2]) is transmitted in a direction of the loopback unit 301. Other operations are similar to those in FIGS. 10 and 11.

In FIG. 12, the WDM optical signal ([A1][A2]) transmitted from the A terminal station 1 is input to the optical branching/coupling device 200, and input to the P1 of each of the WSSs 131 and 132 through the amplifier 103, and the couplers 101 and 121. Herein, electric power of the WSS 131 is off, and, as a result, only the P2 and the P3 are connected in the WSS 131. Electric power of the WSS 132 is also off, and, as a result, only the P1 and the P3 of the WSS 132 are connected therein. Therefore, the WDM optical signal ([A1][A2]) is output from the P3 of the WSS 132, and transmitted to the loopback unit 301 through the switch 111, the switch 112, and the amplifier 106.

On the other hand, the WDM optical signal ([A1][C2]) output from the loopback unit 301 is input to the P2 of each of the WSSs 131 and 132 through the amplifier 105 and the coupler 122. Herein, because the P2 and the P3 of the WSS 131 are connected therein, the WDM optical signal ([A1][C2]) is output from the P3 of the WSS 131, and transmitted in a direction of the B terminal station 2 through the switch 111 and the amplifier 104.

Thus, in the third operation example when the WSSs 131 and 132 are broken, the B terminal station 2 can receive the WDM optical signal ([A1][C2]), unless a function by which all wavelengths are transmitted between particular input/output ports, when electric power is off in the WSSs 131 and 132, is lost. Moreover, the C terminal station 3 can receive the optical signal ([A2]).

2-7. Modification Example of Wavelength Selection Unit 120

Figure 13:
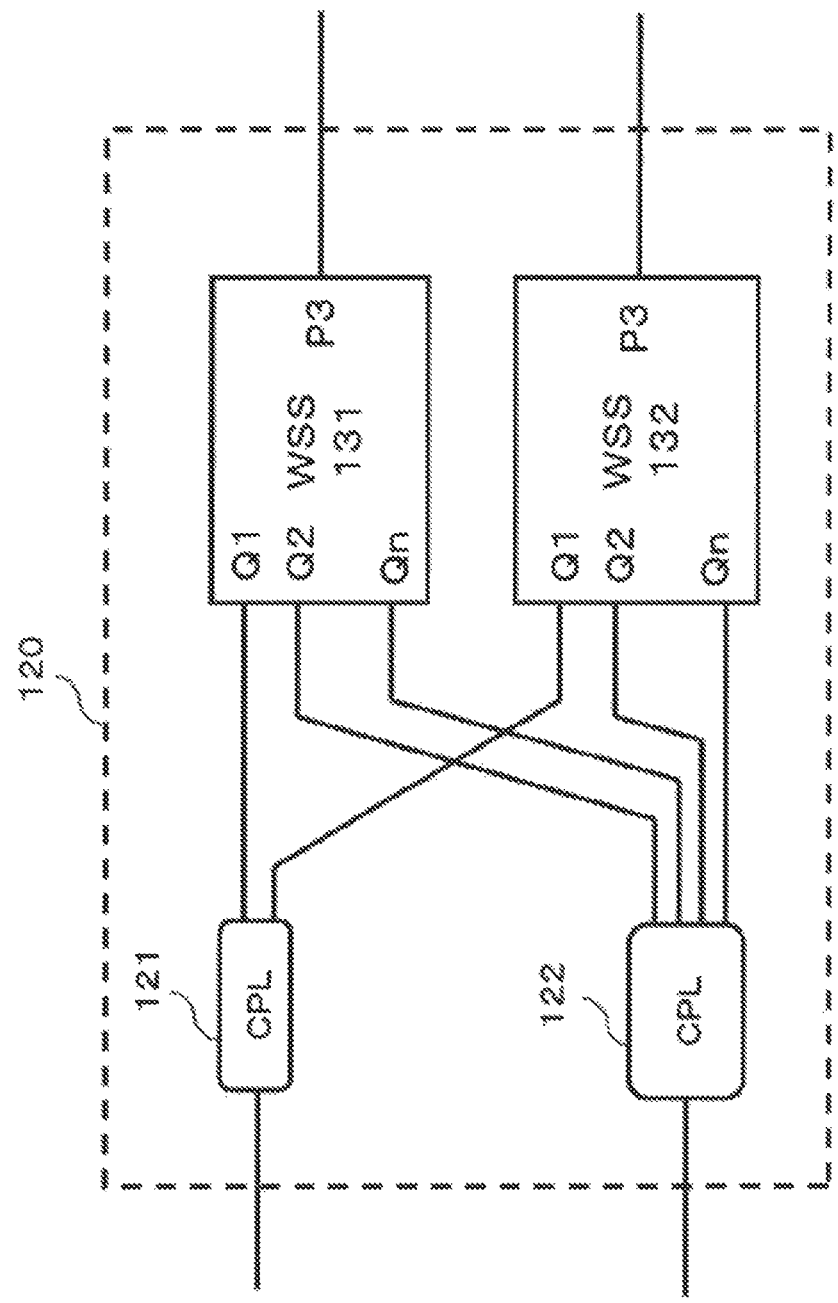

FIG. 13 is a block diagram illustrating a configuration example of the wavelength selection unit 120 when the WSSs 131 and 132 include n (n is an integer of 2 or more) input ports Q1 to Qn. In the example embodiments described so far, input ports of the WSSs 131 and 132 are only two input ports P1 and P2. However, a WSS including three or more input ports is also known. In the configuration of FIG. 13, the Q1 and the Q2 can be used as input ports at a normal time, and an input port that transmits all wavelengths, when electric power is off, can be a port (e.g., Qn) other than the Q1 and the Q2. In this case, in a WSS that is broken and thus has electric power turned off, an optical signal input from the coupler 122 is propagated to the P3 from the Qn. Therefore, the wavelength selection unit 120 illustrated in FIG. 13 can be used instead of the wavelength selection unit 120 in FIGS. 10 and 11.

2-8. Fourth Operation Example when the WSS 131 and the WSS 132 are Both Broken The switch 111 included in each of the optical branching/coupling devices 100 and 200 is a 2×2 optical switch inputs of which are the P1 and P2 and outputs of which are the P3 and P4. In the description so far, states of the switch 111 include a state (e.g., FIGS. 2 and 7) in which the P1 and the P3 are connected to each other, and the P2 and the P4 are connected to each other, and a state (e.g., FIGS. 3 and 8) in which the P2 and the P3 are connected to each other, and the P1 and the P4 are open.

Figure 14:
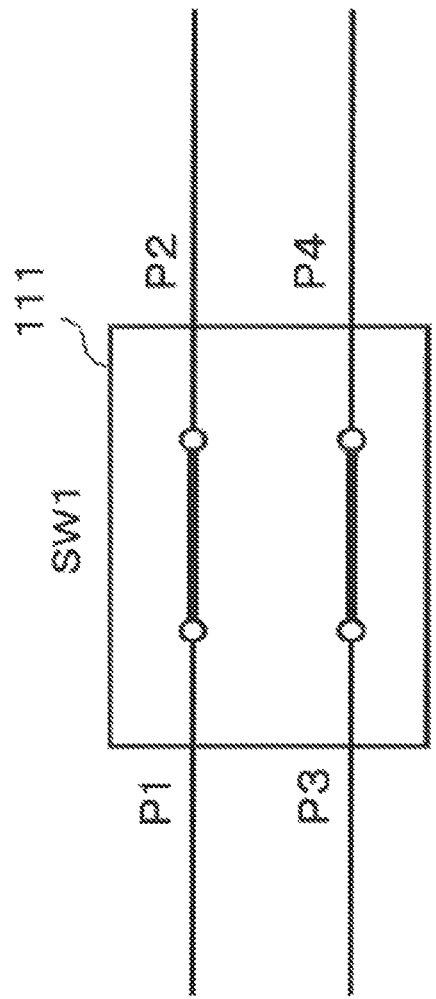
Figure 15:
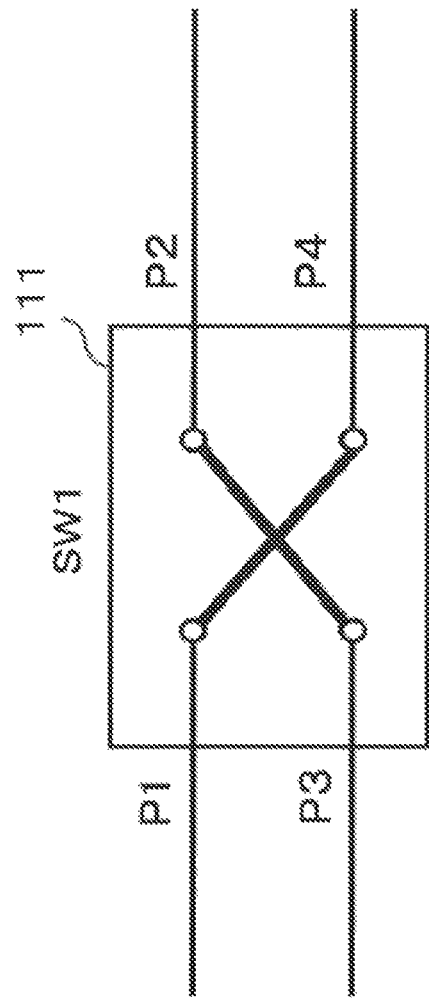
FIG. 15 A diagram illustrating an example of a connection state of the input/output of the switch 111

FIGS. 14 and 15 are diagrams illustrating examples of connection states of an input/output of the switch 111. FIG. 14 is a connection state corresponding to, for example, FIGS. 2 and 7. However, a 2×2 optical switch being capable of a state in which the P1 and the P4 are connected to each other, and the P2 and the P3 are connected to each other as in FIG. 15 is also known. An example in which an optical switch being capable of such a connection state is used as the switch 111 is described.

Figure 16:
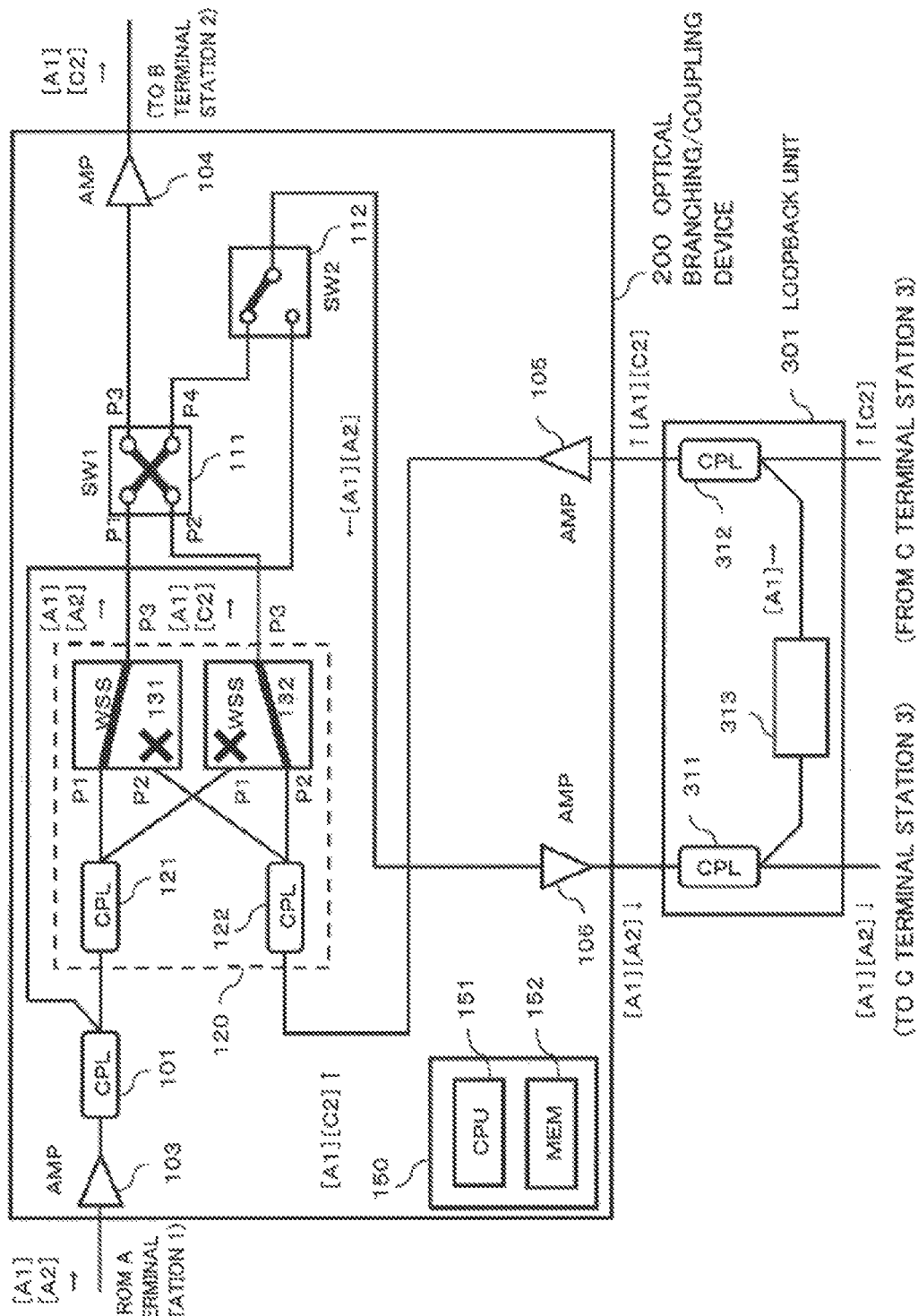
FIG. 16 A block diagram illustrating a fourth operation example of the optical branching/coupling device 200 when the WSS 131 and the WSS 132 are both broken FIG. 17 A block diagram illustrating a configuration example of an optical branching/coupling device 300 according to a third example embodiment FIG. 18 A first diagram illustrating an operation example of the optical branching/coupling device 300

FIG. 16 is a block diagram illustrating a fourth operation example of the optical branching/coupling device 200 when the WSS 131 and the WSS 132 are both broken. As compared with the example of FIG. 12, operations of the WSSs 131 and 132 when electric power is off, and an operation of the switch 111 are different in the example of FIG. 16. In other words, only an optical signal input to the P1 of the WSS 131, when electric power of the WSS 131 is off, is output from the P3 of the WSS 131 regardless of a wavelength band. Moreover, only an optical signal input to the P2 of the WSS 132, when electric power of the WSS 132 is off, is output from the P3 of the WSS 132 regardless of a wavelength band. In addition, in FIG. 16, the switches 111 and 112 are set in such a way that the WDM optical signal ([A1][C2]) is transmitted in a direction of the B terminal station 2, and the WDM optical signal ([A1][A2]) is transmitted in a direction of the loopback unit 301. Other operations are similar to those in FIG. 12.

The switch 111 in FIG. 16 can be set in such a way that the P1 and the P4 are connected to each other, and the P2 and the P3 are connected to each other, as illustrated in FIG. 15. Therefore, even when WDM optical signals output from the WSSs 131 and 132 are interchanged as compared with the example of FIG. 12, it is possible to achieve an operation similar to that in FIG. 12, by controlling a connection state of the switch 111 as in FIG. 15.

As described above, in the optical branching/coupling device 200, optical signals transmitted from the A terminal station 1 and the C terminal station 3 reach a terminal station being a destination, even when one or both of the WSSs 131 and 132 are broken, as in the optical branching/coupling device 100. Thus, a degree of reliability required for a single WSS is eased, and it becomes possible to apply an optical branching/coupling device to a submarine cable system for which a long-period performance guarantee is required. In other words, the optical branching/coupling device 200 according to the second example embodiment can provide an optical branching/coupling device having high reliability.

Furthermore, the optical branching/coupling device 200 does not need the coupler 102 and the switch 113, as compared with the optical branching/coupling device 100. Therefore, the optical branching/coupling device 200 according to the second example embodiment is capable of further size reduction and cost reduction of an optical branching/coupling device.

The CPU 151 and the memory device 152 of the control circuit 150 according to the first and second example embodiments may be included in any parts of the optical branching/coupling devices 100 and 200. The CPU 151 achieves a function of the optical branching/coupling device according to each example embodiment, by executing a program stored in the memory device 152. The memory device 152 is a fixed and non-transitory storage medium. A semiconductor memory or a fixed magnetic disk device is used, but not limited to, as a storage medium.

Third Example Embodiment

Figure 17:
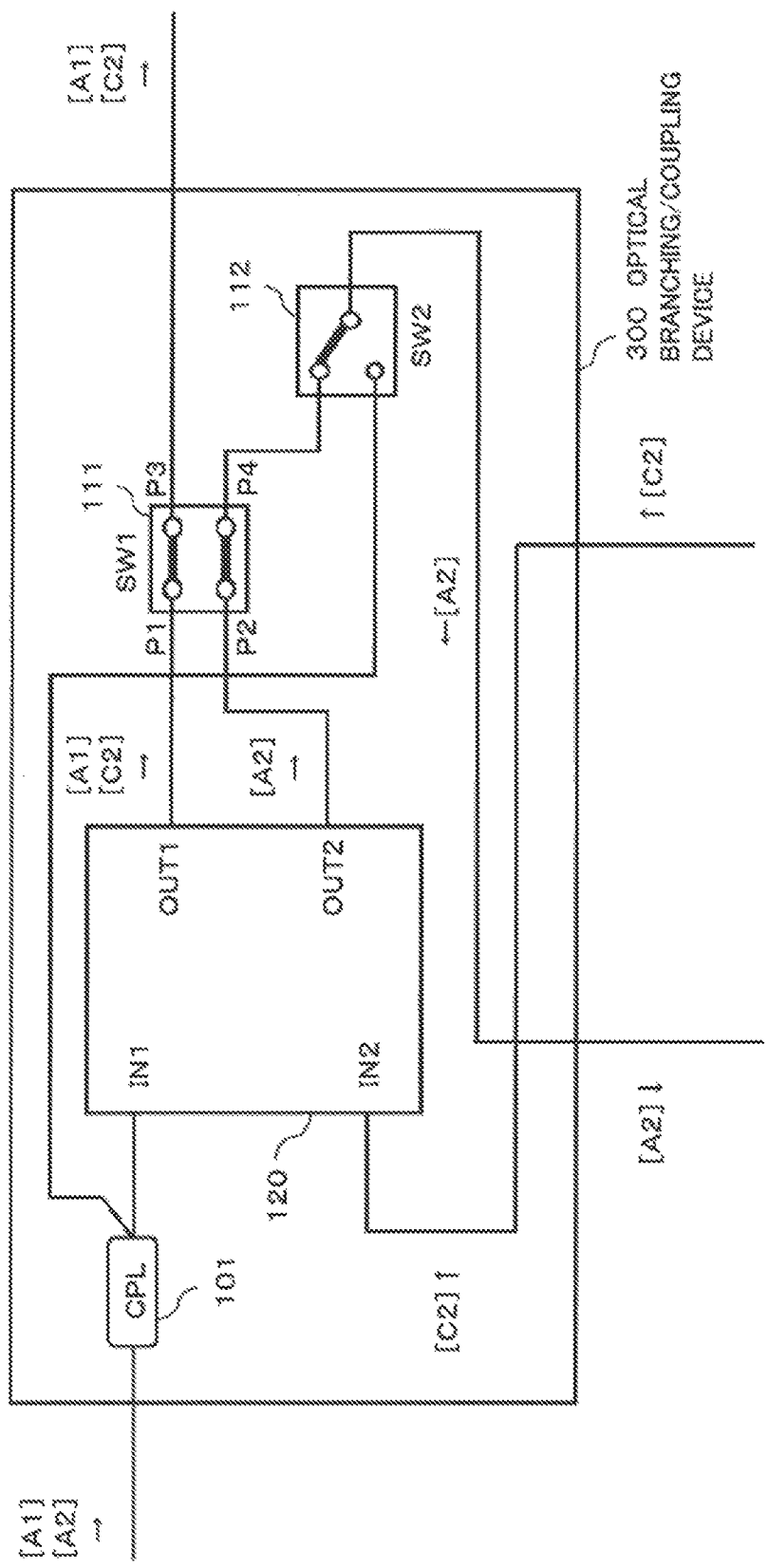

FIG. 17 is a block diagram illustrating a configuration example of an optical branching/coupling device 300 according to a third example embodiment of the present invention. As compared with the optical branching/coupling device 200 according to the second example embodiment illustrated in FIG. 7, amplifiers 103 to 106 and a control circuit 150 are omitted in the optical branching/coupling device 300. Moreover, a wavelength selection unit 120 may be configured including the couplers 121 and 122 and the WSSs 131 and 132 illustrated in FIG. 7.

The optical branching/coupling device 300 includes a coupler 101 (first branching/coupling means), a wavelength selection unit 120 (wavelength selection means), a switch 111 (first optical switching means), and a switch 112 (second optical switching means).

The coupler 101 splits a WDM optical signal ([A1][A2]) (first light), and then outputs as second light and third light. The WDM optical signal ([A1][A2]) includes an optical signal ([A1]) (an optical signal on a first wavelength band), and an optical signal ([A2]) (an optical signal on a second wavelength band) that does not overlap the optical signal ([A1]) in wavelength band. The branched WDM optical signal ([A1][A2]) is input to an IN1 (first input) of the wavelength selection unit 120, and fourth light including the optical signal ([C2]) is input to an IN2 (second input). A wavelength band of the optical signal ([C2]) does not overlap that of the optical signal ([A1]). The first light and the fourth light may be input from different devices outside the optical branching/coupling device 300, respectively.

The wavelength selection unit 120 outputs light (fifth light and sixth light) from an OUT1 (first output) and an OUT2 (second output), respectively. Herein, the wavelength selection unit 120 is configured in such a way that one of kinds of light output from the wavelength selection unit 120 can include a WDM optical signal ([A1][C2]), and another can include the optical signal ([A2]).

Either one of the fifth light or the sixth light output from the wavelength selection unit 120 is input to either one of a P1 or a P2 being two inputs of the switch 111, and another of the kinds of light output from the wavelength selection unit 120 is input to another of the P1 and P2. The switch 111 can output one and another of the kinds of light output from the wavelength selection unit 120, respectively.

The WDM optical signal ([A1][A2]) branched at the coupler 101 is input to one of the two input ports of the switch 112, and one of kinds of light output from the wavelength selection unit 120 is input to another of the two input ports of the switch 112. Then, the switch 112 can output one of kinds of input light.

When light output from the wavelength selection unit 120 is normal, the WDM optical signal ([A1][C2]) is output to outside of the optical branching/coupling device 300 via a P3 of the switch 111. Moreover, the optical signal ([A2]) is output to outside of the optical branching/coupling device 300 via the switch 112. A WDM optical signal (eighth light) output from the P3 of the switch 111, and an optical signal (ninth light) output from the switch 112 may be connected to devices outside the optical branching/coupling device 300, respectively.

Figure 18:
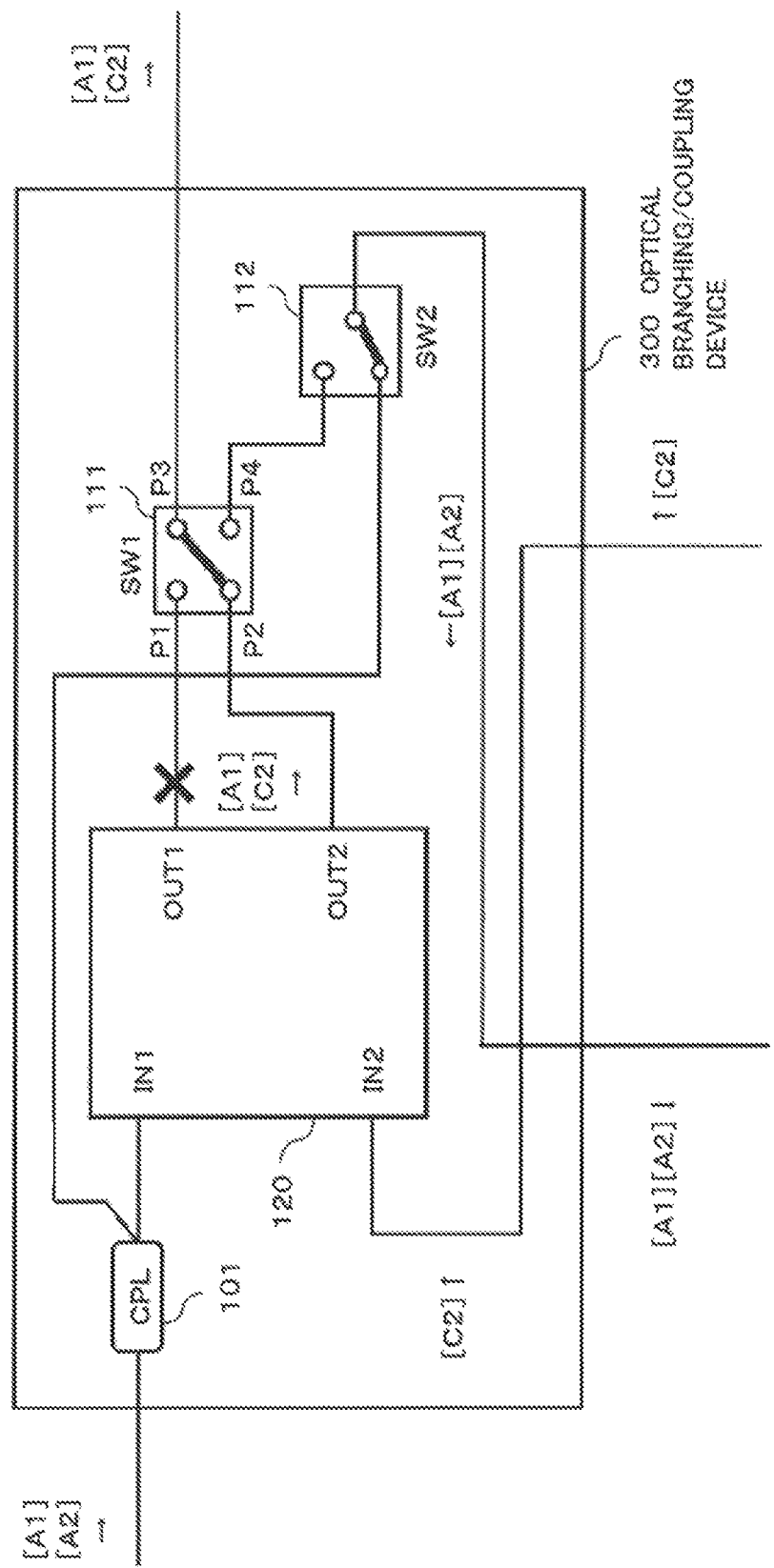

FIG. 18 is a first diagram illustrating an operation example of the optical branching/coupling device 300. When the WDM optical signal ([A1][C2]) is output from one of kinds of light output from the wavelength selection unit 120, and another of the kinds of light is abnormal, the switch 111 selects and then outputs, to outside of the optical branching/coupling device 300, the WDM optical signal ([A1][C2]). For example, there is a case where, due to partial failure of the wavelength selection unit 120, the WDM optical signal ([A1][C2]) is output from one output of the wavelength selection unit 120, and another output is cut off.

In such a case, the switch 111 is set in such a way that the WDM optical signal ([A1][C2]) is output from the P3 of the switch 111.

Referring to FIG. 18, the wavelength selection unit 120 is set in such a way as to output the sixth light (WDM optical signal ([A1][C2])) from the OUT2, when the fifth light is not output from the OUT1 (first output). In FIG. 18, the switch 111 is controlled in such a way that the sixth light output from the OUT2 is input to the P2 of the switch 111, and output to outside of the optical branching/coupling device 300 from the P3 as the eighth light. The switch 112 is controlled in such a way that the third light (WDM optical signal ([A1][A2])) branched at the coupler 101 is output to outside of the optical branching/coupling device 300 as the ninth light.

For control of such switches 111 and 112, the wavelength selection unit 120 may directly control the switches 111 and 112, by detecting abnormality of the wavelength selection unit 120 itself. Alternatively, the switches 111 and 112 may be controlled by a function, provided in the optical branching/coupling device 300, of monitoring an operation of the wavelength selection unit 120.

Figure 19:
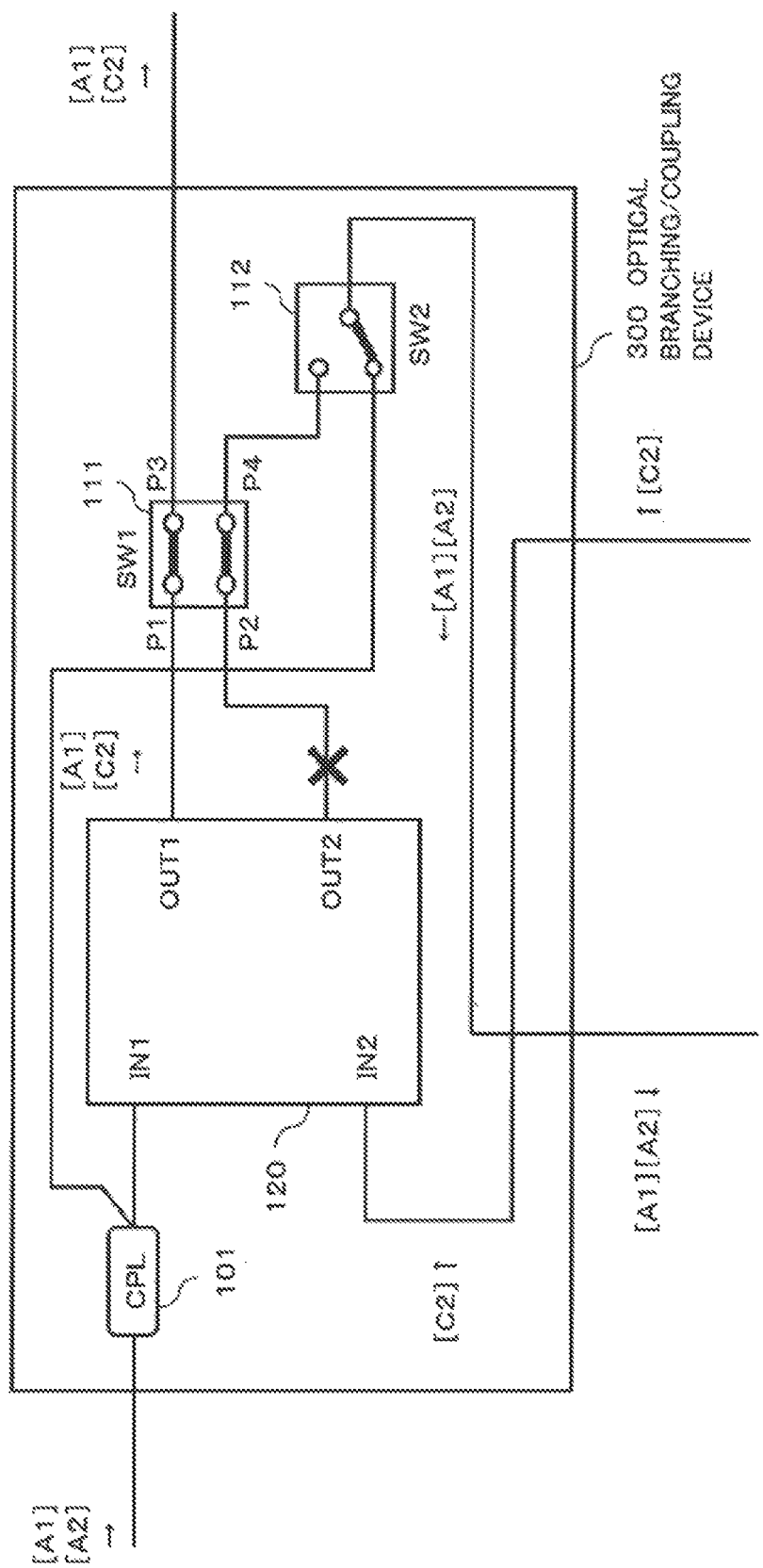
FIG. 19 A second diagram illustrating an operation example of the optical branching/coupling device 300

FIG. 19 is a second diagram illustrating an operation example of the optical branching/coupling device 300. The wavelength selection unit 120 is set in such a way as to output the fifth light (WDM optical signal ([A1][C2])) from the OUT1, when the sixth light is not output from the OUT2 (second output). In FIG. 19, the switch 111 is controlled in such a way that the fifth light output from the OUT1 is output from the P3 of the switch 111. The switch 112 is controlled in such a way that the third light (WDM optical signal ([A1][A2])) branched at the coupler 101 is output to outside of the optical branching/coupling device 300 as the ninth light.

As illustrated in FIGS. 17 to 19, the switch 111 is set in such a way that the WDM optical signal ([A1][C2]) is output to outside through the P3 of the switch 111.

FIG. 20 is a flowchart illustrating an example of an operation procedure of the optical branching/coupling device 300 described above. By the coupler 101, the optical branching/coupling device 300 splits first light including an optical signal on a first wavelength band, and an optical signal on a second wavelength band that does not overlap the first wavelength band, and then outputs branched light as second light and third light (step S01 in FIG. 20). The second light is input to a first input of the wavelength selection unit 120, and fourth light including an optical signal on a third wavelength band that does not overlap the first wavelength band is input to a second input. Then, the wavelength selection unit 120 outputs fifth light from a first output, and outputs sixth light from a second output (step S02). Herein, either one of the fifth light or the sixth light includes an optical signal on the first wavelength band of the second light, and the fourth light, and another includes an optical signal on the second wavelength band. The switch 111 outputs either one of the fifth light or the sixth light as seventh light, and outputs another as eighth light (step S03). The switch 112 outputs the third light or the eighth light as ninth light (step S04).

As described above, in the optical branching/coupling device 300, the WDM optical signal ([A1][C2]) is output to outside as eighth light, and a signal including the optical signal ([A2]) is output to outside as ninth light, even when one of outputs of the wavelength selection unit 120 is abnormal. In other words, the eighth light and the ninth light output, when the wavelength selection unit 120 is normal, is not lost even when the WDM optical signal ([A1][C2]) is output from one of kinds of light output from the wavelength selection unit 120, and another of the kinds of light is abnormal. In other words, the optical branching/coupling device 300 according to the third example embodiment can provide an optical branching/coupling device having high reliability.

The example embodiments of the present invention may be described as, but are not limited to, the following supplementary notes.

(Supplementary Note 1)

An optical branching/coupling device including:

a first optical branching means configured in such a way as to be able to split first light including an optical signal on a first wavelength band and an optical signal on a second wavelength band that does not overlap the first wavelength band, and then output branched light as second light and third light;

a wavelength selection means configured in such a way that the second light can be input to a first input, fourth light including an optical signal on a third wavelength band that does not overlap the first wavelength band can be input to a second input, fifth light can be output from a first output, sixth light can be output from a second output, either one of the fifth light or the sixth light can include an optical signal on the first wavelength band of the second light and also include the fourth light, and another can include an optical signal on the second wavelength band;

a first optical switching means configured in such a way that the fifth light can be input to one of two inputs, the sixth light can be input to another, either one of the fifth light or the sixth light can be output as seventh light, and another can be output as eighth light; and a second optical switching means configured in such a way that the third light can be input to one of two inputs, the eighth light can be input to another, and either one of the input third light or the input eighth light can be output as ninth light.

(Supplementary Note 2)

The optical branching/coupling device according to supplementary note 1, wherein, when the fifth light and the sixth light are output from the wavelength selection means, the wavelength selection means outputs a signal including an optical signal on the first wavelength band and the fourth light as the fifth light, and outputs an optical signal on the second wavelength band as the sixth light, the first optical switching means outputs the fifth light as the seventh light, and outputs the sixth light as the eighth light, and the second optical switching means outputs the eighth light as the ninth light.

(Supplementary Note 3)

The optical branching/coupling device according to supplementary note 1 or 2, wherein, when the fifth light is not output from the wavelength selection means, the wavelength selection means outputs a signal including an optical signal on the first wavelength band and the fourth light as the sixth light, the first optical switching means outputs the sixth light as the seventh light, and the second optical switching means outputs the third light as the ninth light.

(Supplementary Note 4)

The optical branching/coupling device according to any one of supplementary notes 1 to 3, wherein, when the sixth light is not output from the wavelength selection means, the wavelength selection means outputs a signal including an optical signal on the first wavelength band and the fourth light as the fifth light, the first optical switching means outputs the fifth light as the seventh light, and the second optical switching means outputs the third light as the ninth light.

(Supplementary Note 5)

The optical branching/coupling device according to any one of supplementary notes 1 to 4, further including:

a loopback means for splitting an optical signal on the first wavelength band included in the ninth light, and inputting, instead of the fourth light, tenth light in which the split optical signal on the first wavelength band and the fourth light are multiplexed, to the second input of the wavelength selection means, wherein the wavelength selection means is configured in such a way that the tenth light can be output from at least one of the first output and the second output via an internal path that transmits an optical signal on the first wavelength band and an optical signal on the third wavelength band, when electric power is not supplied to the wavelength selection means.

(Supplementary Note 6)

The optical branching/coupling device according to supplementary note 5, wherein the wavelength selection means is configured in such a way as to output an output of the tenth light from the first output via an internal path that transmits an optical signal on the first wavelength band and an optical signal on the third wavelength band, when electric power is not supplied to the wavelength selection means, and output an output of the second light from the second output via an internal path that transmits an optical signal on the first wavelength band and an optical signal on the second wavelength band, when electric power is not supplied to the wavelength selection means.

(Supplementary Note 7)

The optical branching/coupling device according to supplementary note 1, further including:

a second optical branching means being able to split the fourth light, then input one of branches to the second input of the wavelength selection means, and output another as eleventh light; and a third optical switching means being able to input one of the eleventh light, and the seventh light, and output either one of the eleventh light or the seventh light.

(Supplementary Note 8)

The optical branching/coupling device according to supplementary note 7, wherein, when the fifth light and the sixth light are output from the wavelength selection means, the wavelength selection means outputs a signal including an optical signal on the first wavelength band and the fourth light as the fifth light, and outputs an optical signal on the second wavelength band as the sixth light, the first optical switching means outputs the fifth light as the seventh light, and outputs the sixth light as the eighth light, the second optical switching means outputs the eighth light as the ninth light, and the third optical switching means outputs the seventh light.

(Supplementary Note 9)

The optical branching/coupling device according to supplementary note 7 or 8, wherein, when the fifth light is not output from the wavelength selection means, the wavelength selection means outputs a signal including an optical signal on the first wavelength band and the fourth light as the sixth light, the first optical switching means outputs the sixth light as the seventh light, the second optical switching means outputs the third light as the ninth light, and the third optical switching means outputs the seventh light.

(Supplementary Note 10)

The optical branching/coupling device according to any one of supplementary notes 7 to 9, wherein, when the sixth light is not output from the wavelength selection means, the wavelength selection means outputs a signal including an optical signal on the first wavelength band and the fourth light as the fifth light, the first optical switching means outputs the fifth light as the seventh light, the second optical switching means outputs the third light as the ninth light, and the third optical switching means outputs the seventh light.

(Supplementary Note 11)

The optical branching/coupling device according to any one of supplementary notes 7 to 10, further including a loopback means being able to split an optical signal on the first wavelength band included in the ninth light, and output, instead of the fourth light, tenth light in which the split optical signal on the first wavelength band and the fourth light are multiplexed, to second optical branching means, wherein, when the fifth light and the sixth light are not output from the wavelength selection means, the second optical switching means outputs the third light as the ninth light, and the third optical switching means outputs the eleventh light.

(Supplementary Note 12)

The optical branching/coupling device according to any one of supplementary notes 1 to 11, wherein the wavelength selection means is configured to include a wavelength selective switch (WSS) being able to multiplex or demultiplex, and then output an input optical signal for each of the first to third wavelength bands.

(Supplementary Note 13)

The optical branching/coupling device according to any one of supplementary notes 1 to 12, further including a control unit that controls the wavelength selection means and the first and second optical switching means.

(Supplementary Note 14)

An optical communication system, wherein the optical branching/coupling device according to any one of supplementary notes 1 to 13 is connected to a first terminal station that transmits the first light to the optical branching/coupling device, a second terminal station that receives the seventh light from the optical branching/coupling device, and a third terminal station that receives the ninth light from the optical branching/coupling device, and transmits the fourth light to the optical branching/coupling device.

(Supplementary Note 15)

The optical communication system according to supplementary note 14, wherein a loopback means being able to split an optical signal on the first wavelength band included in the ninth light, and output, instead of the fourth light, tenth light in which the split optical signal on the first wavelength band and the fourth light are multiplexed, to second optical branching means, is disposed between the third terminal station and the optical branching/coupling device.

(Supplementary Note 16)

An optical branching/coupling method including:

splitting input first light including a first wavelength band and a second wavelength band that does not overlap the first wavelength band, and then outputting branched light as second light and third light;

generating, based on the second light, and fourth light having a third wavelength band that does not overlap the first wavelength band, fifth light including at least one of a signal on the first wavelength band of the second light, and the fourth light, and sixth light including at least one of a signal on the first or second wavelength band of the second light, and the fourth light;

when the fifth light and the sixth light are input, outputting either one of the fifth light or the sixth light as seventh light, and outputting another as eighth light; and, when the third light and the eighth light are input, outputting the third light or the eighth light as ninth light.

While the invention of the present application has been described above with reference to the example embodiments, the invention of the present application is not limited to the example embodiments described above. Various changes that can be understood by a person skilled in the art may be made to a configuration and details of the invention of the present application within the scope of the invention of the present application.

This application is based upon and claims the benefit of priority from Japanese Patent Application No. 2016-208265, filed on Oct. 25, 2016, the disclosure of which is incorporated herein in its entirety by reference.

REFERENCE SIGNS LIST

1 A terminal station
2 B terminal station
3 C terminal station
4 Amplifier
5 Submarine cable
10 Submarine cable system
100, 200, 300 Optical branching/coupling device
101, 102, 121, 122, 311, 312 Coupler
103 to 106 Amplifier
111, 112, 113 Switch
120 Wavelength selection unit
150 Control circuit
151 CPU
152 Memory device
301 Loopback unit
313 Filter

What is claimed is:

1. An optical branching/coupling device comprising:
a first sputter configured to split an optical signal from a first terminal station;
a second splitter configured to split an optical signal from a second terminal station;
a wavelength selector configured to:
output, from a first output port, an optical signal on a first wavelength band and an optical signal on a third wavelength band that does not overlap the first wavelength band; and
output, from a second output port, an optical signal on a second wavelength band that does not over the first wavelength band, based on:
the optical signal on the first wavelength band and the optical signal on the second wavelength band that are input to a first input port; and
the optical signal on the third wavelength band that is input to a second input port,
wherein the optical signals of the first to the third wavelength band are derived from output of the first splitter and output of the second sputter, a crossbar switch configured to:
output a first output signal and a second output signal, based on outputs of the first output port and the second output port;
a first optical switch configured to:
output, to the second terminal station, one of an optical signal split at the first splitter and the first output signal of the crossbar switch; and
a second optical switch configured to:
output, to a third terminal station, one of an optical signal split at the second splitter and a second output signal of the crossbar switch.

2. The optical branching/coupling device according to claim 1, wherein when the wavelength selector outputs an optical signal from each of the first output port and the second output port:
the crossbar switch:
outputs, to the second optical switch, an output of the first output port; and
outputs, to the first optical switch, an output of the second output port,
the first optical switch outputs, to the second terminal station, the first output signal of the crossbar switch; and
the second optical switch outputs, to the third terminal station, the second output signal of the crossbar switch.

3. The optical branching/coupling device according to claim 1, wherein when an optical signal from the second output port is absent:
the crossbar switch outputs, to the second optical switch, an output of the first output port;
the first optical switch outputs, to the second terminal station, an output of the first splitter; and
the second optical switch outputs, to the third terminal station, the second output signal from the crossbar switch.

4. The optical branching/coupling device according to claim 1, wherein when an optical signal from the first output port of the wavelength selector is absent:
the crossbar switch outputs, to the second optical switch, an output of the second output port of the wavelength selector;
the first optical switch outputs, to the second terminal station, an output of the first splitter; and
the second optical switch outputs, to the third terminal station, the second output signal from the crossbar switch.

5. The optical branching/coupling device according to claim 4, wherein the wavelength selector outputs, from the second output port, the optical signal on the first wavelength band and the optical signal on the third wavelength band instead of the optical signal on the second wavelength band.

6. The optical branching/coupling device according to claim 1, comprising a loopback circuit configured to:
- split an optical signal input from the first optical switch before the second terminal station; and
- multiplex an optical signal input from the second terminal station and an optical signal split by the loopback circuit before the second splitter, wherein when both of signals output from the first output port and the second output port are absent:
- the first optical switch outputs, to the second terminal station, an output of the first splitter; and
- the second optical switch outputs, to the third terminal station, an output of the second splitter.

7. The optical branching/coupling device according to claim 1, wherein the wavelength selector is configured to include a plurality of wavelength selective switches (WSSs) configured to multiplex or demultiplex, and then output an input optical signal for each of the first to third wavelength bands.

8. The optical branching/coupling device according to claim 1, further comprising a control unit configured to control the wavelength selector, the crossbar switch, the first optical switch and the second optical switch.

9. An optical communication system, wherein the optical branching coupling device according to claim 1 is connected to:
- the first terminal station configured to transmit, to the optical branching/coupling device, an optical signal on a predetermined wavelength band;
- the third terminal station configured to receive, from the optical branching/coupling device, an optical signal on a predetermined wavelength band; and
- the second terminal station configured to receive an optical signal on a predetermined wavelength band split by the optical branching/coupling device and transmitting an optical signal on an predetermined wavelength band to be used for multiplexing at the optical branching/coupling device.

10. An optical branching/coupling method comprising:
- splitting, by a first sputter, an optical signal from a first terminal station;
- splitting, by a second sputter, an optical signal from a second terminal station;
- outputting, from a first output port of a wavelength selector, an optical signal on a first wavelength band and an optical signal on a third wavelength band that does not overlap the first wavelength band; and
- outputting, from a second output port of the wavelength selector, an optical signal on a second wavelength band that does not overlap the first wavelength band, based on:
  - the optical signal on the first wavelength band and the optical signal on the second wavelength band that are input to a first input port; and
  - the optical signal on the third wavelength band that is input to a second input port,
  - wherein the optical signals of the first to the third wavelength band are derived from output of the first splitter and output of the second sputter,
- outputting, from a crossbar switch, a first output signal and a second output signal based on outputs of the first output port and the second output port;
- outputting, from a first optical switch to the second terminal station, one of an optical signal split at the first sputter and the first output signal of the crossbar switch; and
- outputting, from a second optical switch to a third terminal station, one of an optical signal split at the second splitter and an second output signal of the crossbar switch.

* * * * *